United States Patent [19]
Puetz

[11] Patent Number: 5,946,440
[45] Date of Patent: Aug. 31, 1999

[54] OPTICAL FIBER CABLE MANAGEMENT DEVICE

[75] Inventor: Curtis Lee Puetz, Apple Valley, Minn.

[73] Assignee: ADC Telecommunications, Inc., Minnetonka, Mich.

[21] Appl. No.: 08/971,824

[22] Filed: Nov. 17, 1997

[51] Int. Cl.[6] .................................................. G02B 6/36
[52] U.S. Cl. ........................................... 385/135; 385/53
[58] Field of Search .................................. 385/134, 135, 385/53, 76–77

[56] References Cited

U.S. PATENT DOCUMENTS

| | | | |
|---|---|---|---|
| 4,359,262 | 11/1982 | Dolan ...................................... | 350/96.2 |
| 4,502,754 | 3/1985 | Kawa ...................................... | 350/96.2 |
| 4,585,303 | 4/1986 | Pinsard et al. .......................... | 350/96.2 |
| 4,595,255 | 6/1986 | Bhatt et al. ............................. | 350/96.2 |
| 4,630,886 | 12/1986 | Lauriello et al. ....................... | 350/96.2 |
| 4,699,455 | 10/1987 | Erbe et al. .............................. | 350/96.2 |
| 4,717,231 | 1/1988 | Dewez et al. ........................... | 350/96.2 |
| 4,765,710 | 8/1988 | Burmeister et al. .................... | 350/95.2 |
| 4,776,662 | 10/1988 | Valleix .................................... | 350/96.2 |
| 4,792,203 | 12/1988 | Nelson et al. ........................... | 350/96.2 |
| 4,824,196 | 4/1989 | Bylander ................................. | 350/96.2 |
| 4,900,123 | 2/1990 | Barlow et al. .......................... | 350/96.2 |
| 4,986,762 | 1/1991 | Keith ...................................... | 439/131 |
| 4,995,688 | 2/1991 | Anton et al. ............................ | 350/96.1 |
| 5,100,221 | 3/1992 | Carney et al. ........................... | 385/135 |
| 5,129,030 | 7/1992 | Petrunia .................................. | 385/135 |
| 5,142,606 | 8/1992 | Carney et al. ........................... | 385/134 |
| 5,167,001 | 11/1992 | Debortoli et al. ....................... | 385/135 |
| 5,274,722 | 12/1993 | Saitoh et al. ............................ | 385/78 |
| 5,317,663 | 5/1994 | Beard et al. ............................. | 385/70 |
| 5,353,367 | 10/1994 | Czosnowski et al. .................. | 385/135 |
| 5,402,515 | 3/1995 | Vidacovich et al. ................... | 385/135 |
| 5,490,229 | 2/1996 | Ghandeharizadeh et al. .......... | 385/135 |
| 5,497,444 | 3/1996 | Wheeler .................................. | 385/135 |
| 5,712,938 | 1/1998 | Lin et al. ................................. | 385/59 |
| 5,717,812 | 2/1998 | VandenEnden et al. ................ | 385/135 |

FOREIGN PATENT DOCUMENTS

| | | | |
|---|---|---|---|
| 40995/85 | of 1985 | Australia ................................ | 385/135 |
| 8655314 A1 | of 1986 | Australia ................................ | 385/135 |
| 146478 | 12/1984 | European Pat. Off. ............... | 385/135 |
| 149250 | 12/1984 | European Pat. Off. ............... | 385/135 |
| 196102 A2 | 3/1986 | European Pat. Off. ............... | 385/135 |
| 406151 A2 | 5/1990 | European Pat. Off. ............... | 385/135 |
| 479226 | 4/1992 | European Pat. Off. ............... | 385/135 |
| 196102 B1 | 3/1993 | European Pat. Off. ............... | 385/135 |
| 538164 A1 | 4/1993 | European Pat. Off. ............... | 385/135 |
| 2531576 | of 1982 | France .................................... | 385/135 |
| 27 35 106 | 8/1977 | Germany ............................... | 385/135 |
| 3308682 | 9/1984 | Germany ............................... | 385/135 |
| 59-74523 | 4/1984 | Japan ..................................... | 385/135 |
| 60-169811 | 9/1985 | Japan ..................................... | 385/135 |
| 61-55607 | 3/1986 | Japan ..................................... | 385/135 |
| 61-90104 | 5/1986 | Japan ..................................... | 385/135 |

OTHER PUBLICATIONS

Northern Telecom brochure entitled "product information bulletin," 16 pages, dated May, 1991.
AT&T brochure entitled "High Density Interconnect System (HDIC)," 4 pages, copyright 1989.

*Primary Examiner*—John D. Lee
*Assistant Examiner*—Victoria D. Hao
*Attorney, Agent, or Firm*—Merchant & Gould P.C.

[57] ABSTRACT

An optical fiber cable management device includes a modular side wall construction, and a plurality of slideable and rotatable cable management trays disposed within the device. The trays can be configured for both termination and storage, storage only, and for supporting cable components. One or more slideable drawers are also provided within the device. The device provides cable termination, splice and storage of the optical fiber cables.

17 Claims, 37 Drawing Sheets

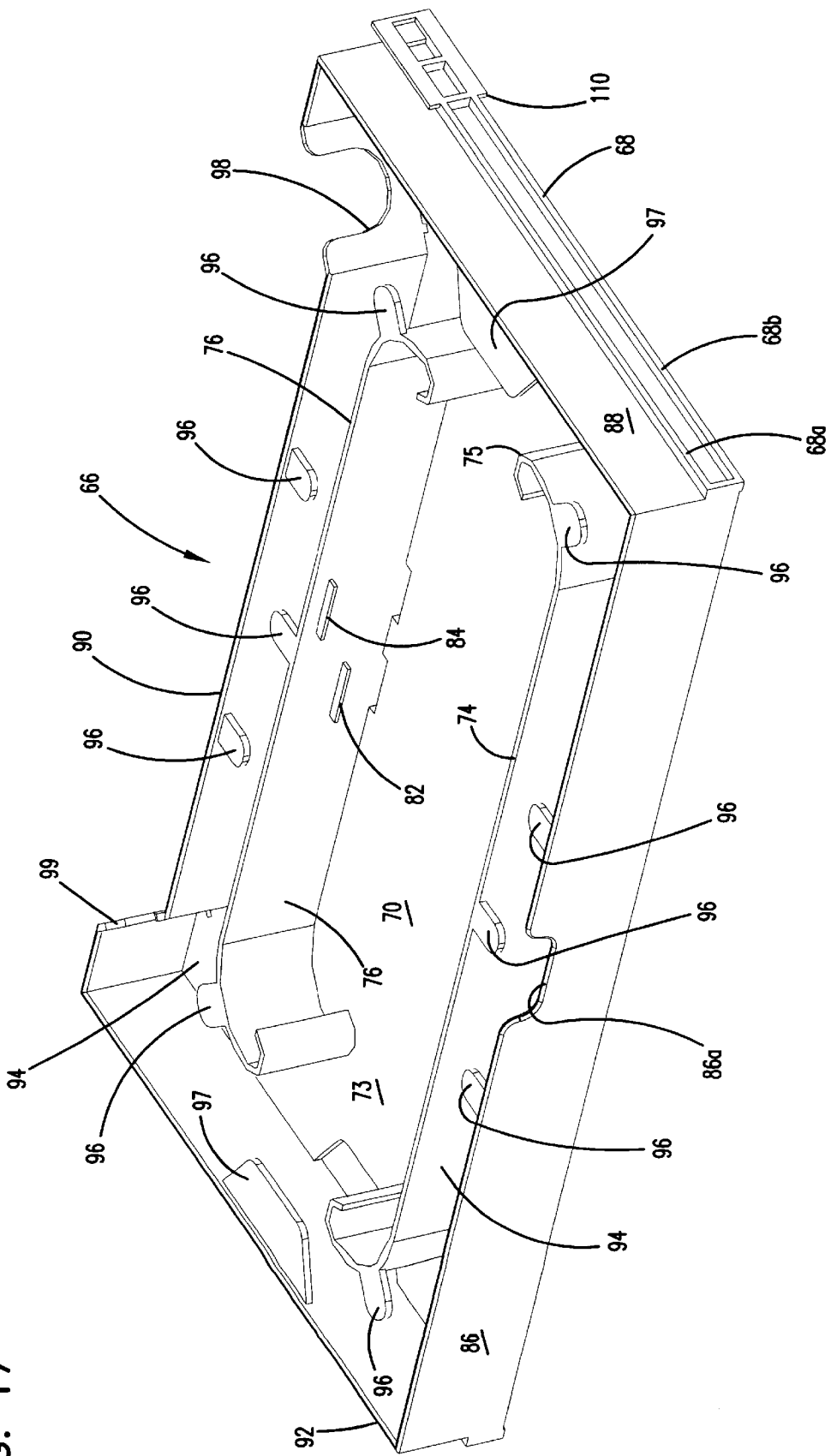

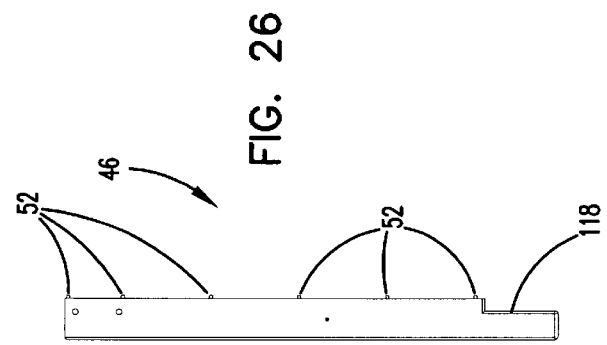
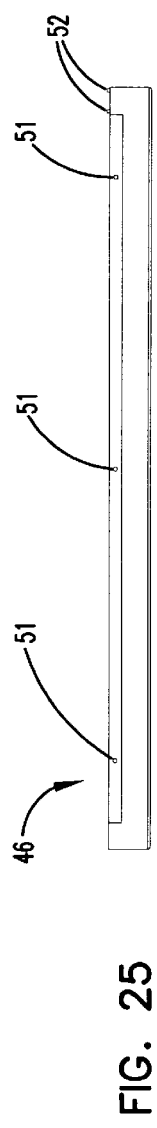
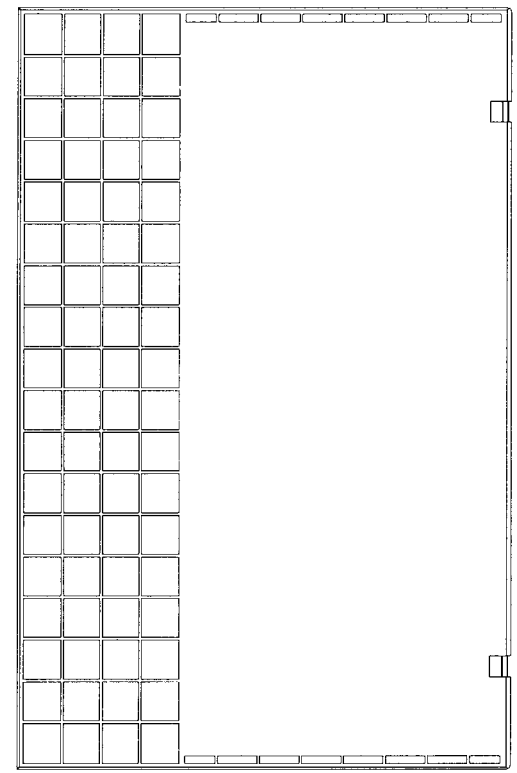
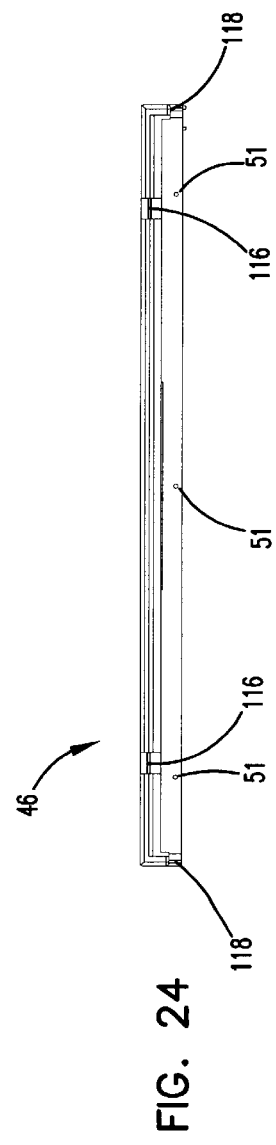

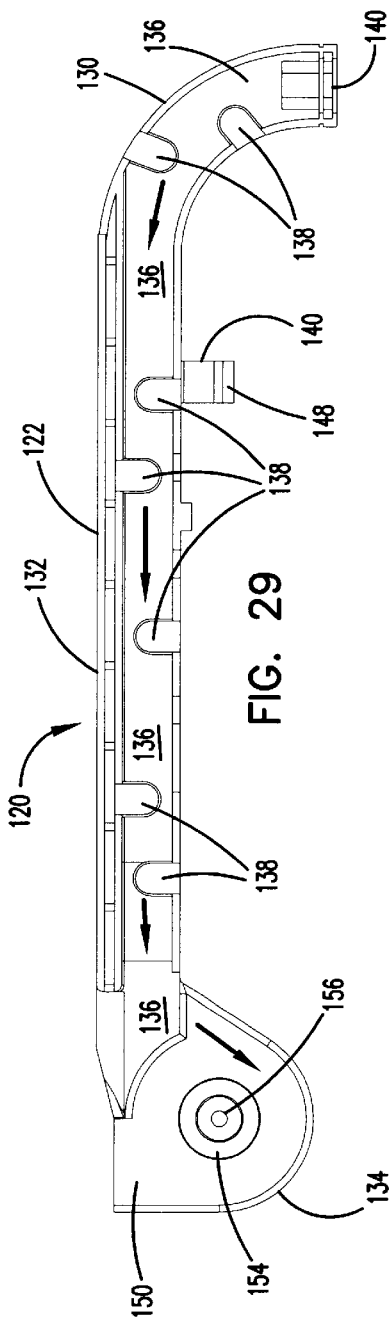
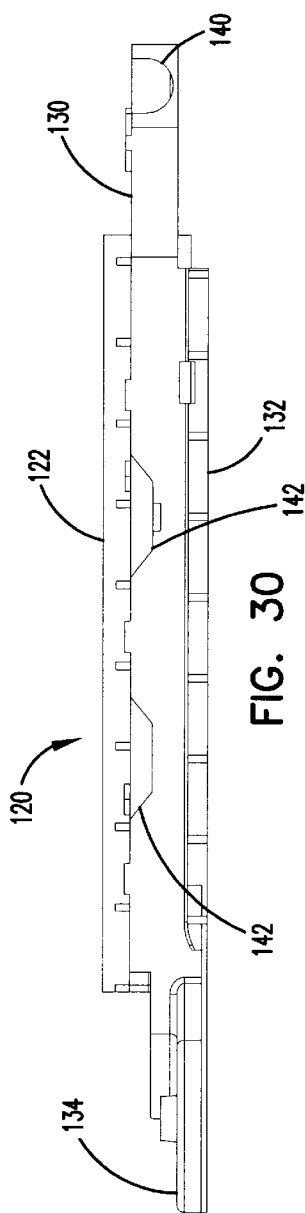
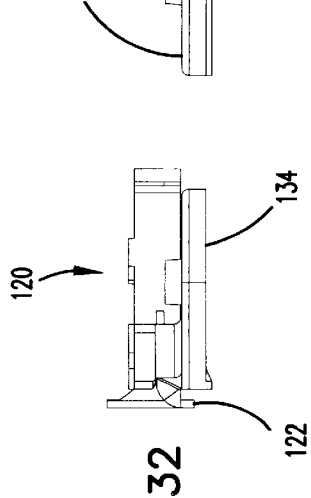
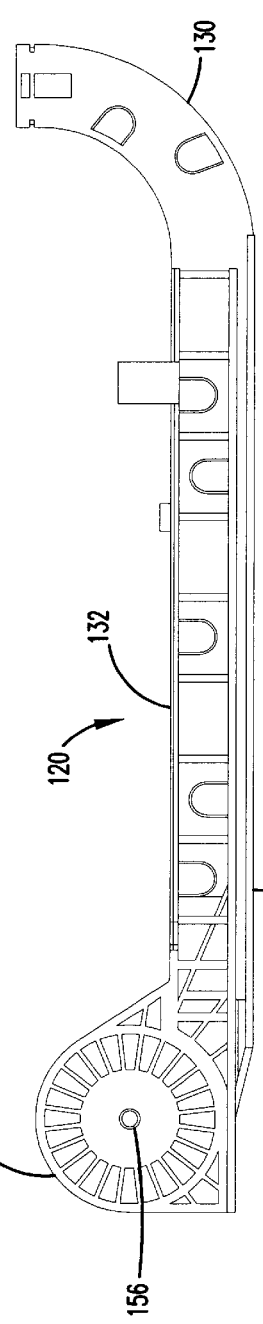

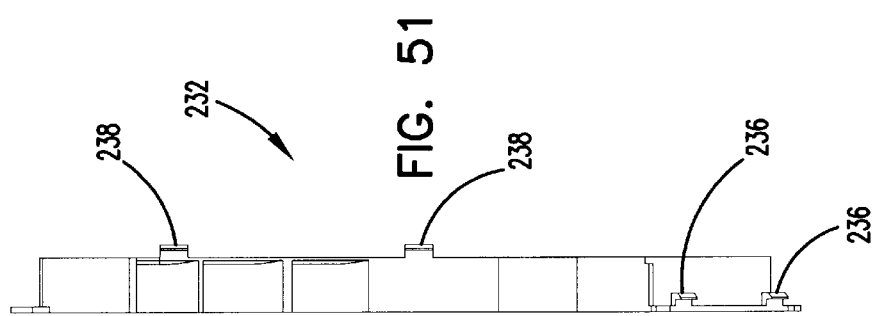
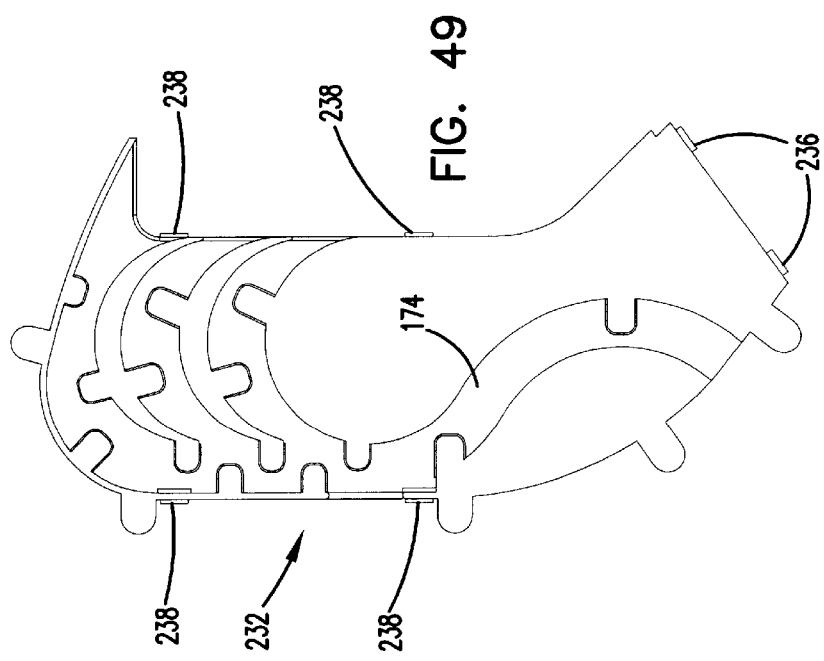
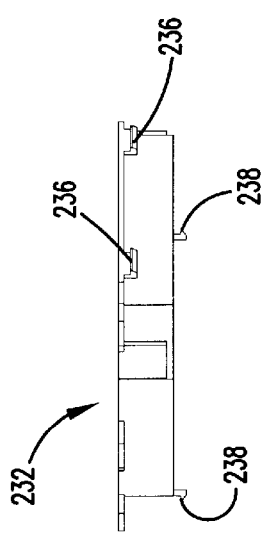
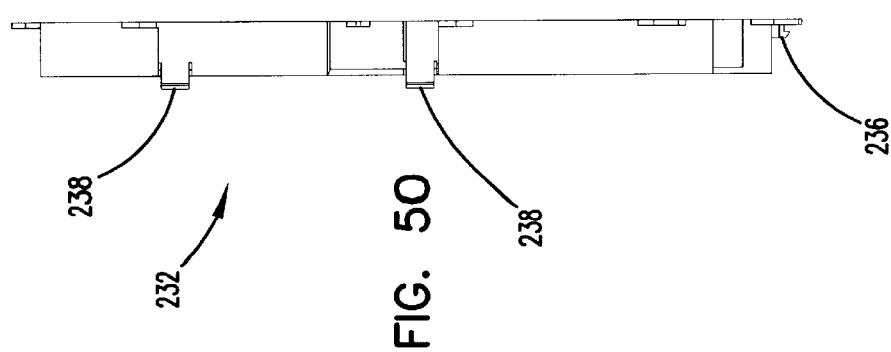

OPTICAL FIBER CABLE MANAGEMENT DEVICE

FIELD OF THE INVENTION

The present invention is concerned with management and distribution of optical fiber cables. The management and distribution device of the present invention has particular application in the telecommunications industry with respect to storing fibers from a trunk cable which interconnect with fibers from individual distribution cables. The invention provides for orderly connection between and distribution of optical fiber cables and for storage of excess cable lengths.

BACKGROUND OF THE INVENTION

Cable termination, splice and storage devices are known including, for example, a device shown in U.S. Pat. No. 4,792,203 issued to ADC Telecommunications, Inc. The device includes a distribution panel which provides a way to permanently connect each fiber from a trunk line to one end of a connector. Fibers from the distribution cable are then connected to the other end of each connector. Because there are a large number of fibers being connected, the device of U.S. Pat. No. 4,792,203 includes various features for organizing the distribution of fibers from the trunk line to the distribution line. There is a continued need in the art for further management and distribution devices which address such concerns in the telecommunications industry as ease of use, size, reliability, cost, and protection of the fibers.

SUMMARY OF THE INVENTION

In one preferred embodiment, a cable management device is provided which includes a plurality of modular side wall portions which are selected during assembly to create a device having a desired height. The device further includes a plurality of cable management trays stored within the device, which are movable with respect to the device in order to access the tray, such as to effect a cable connection. Preferably, the trays are movable by sliding and rotating each tray relative to the device. Each tray may include both a storage and termination capability, a storage only capability, or a cable component mounting capability. In the case of cable termination capability, sliding mounts for the termination ends are provided. Slideable drawers may also be provided, such as for holding splice trays or for cable storage.

BRIEF DESCRIPTION OF THE DRAWINGS

FIG. 17 is a top perspective view of the drawer of the device of FIG. 1.

FIG. 23 is a top view of the top cover.

FIG. 24 is a front view of the top cover.

FIG. 25 is a back view of the top cover.

FIG. 26 is a right side view of the top cover.

FIG. 29 is a top view of the sliding pivot member.

FIG. 30 is a side view of the sliding pivot member.

FIG. 31 is a bottom view of the sliding pivot member.

FIG. 32 is a front end view of the sliding pivot member.

FIG. 49 is a top view of the tray insert.

FIG. 50 is a side view of the tray insert.

FIG. 51 is an opposite side view to the side view of FIG. 50 of the tray insert.

FIG. 52 is a front view of the tray insert.

DETAILED DESCRIPTION OF THE PREFERRED EMBODIMENTS

Figure 1:
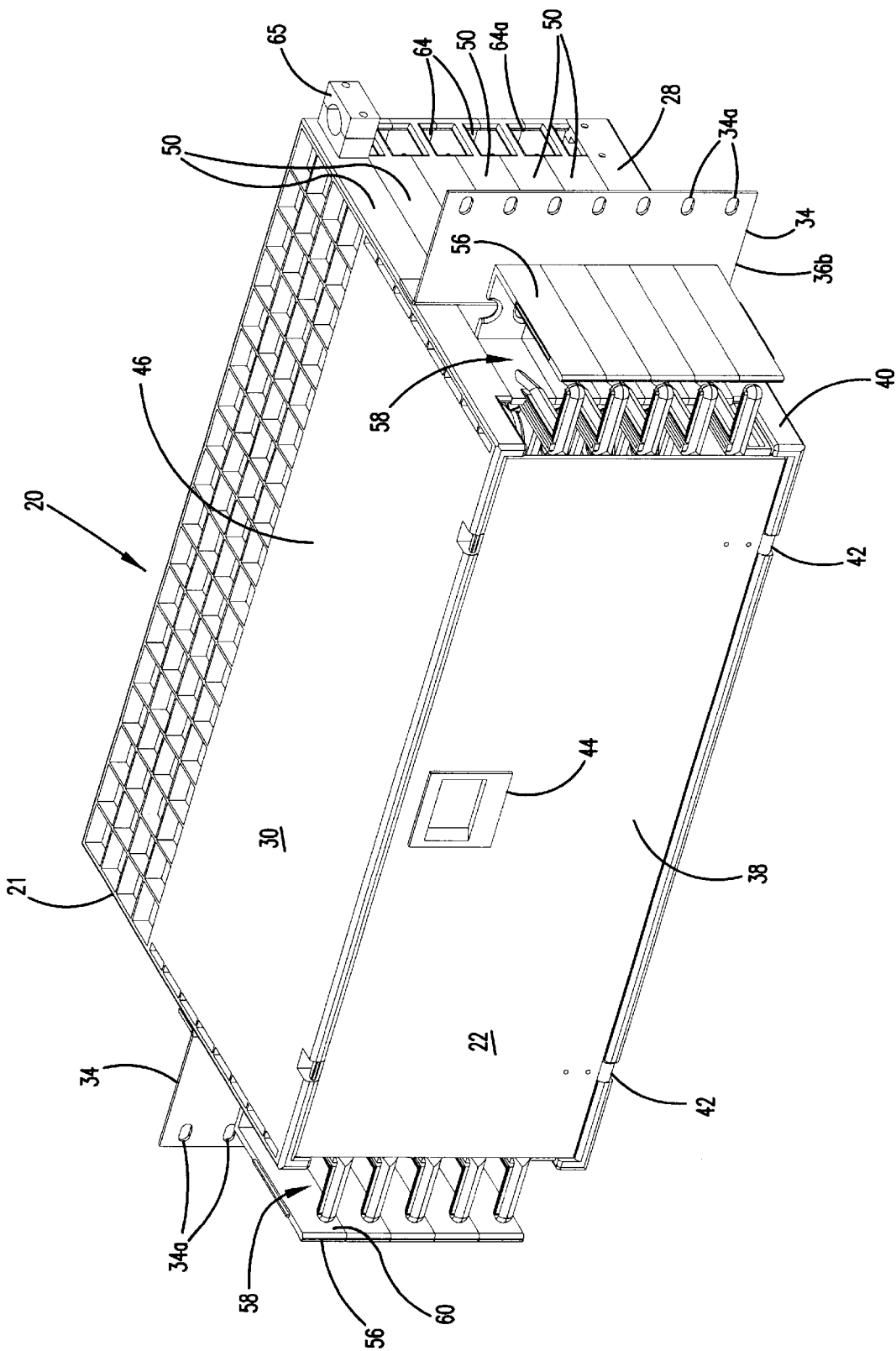
FIG. 1 is a front, top, and right side perspective view of an embodiment of a cable management device in accordance with the present invention.
Figure 2:
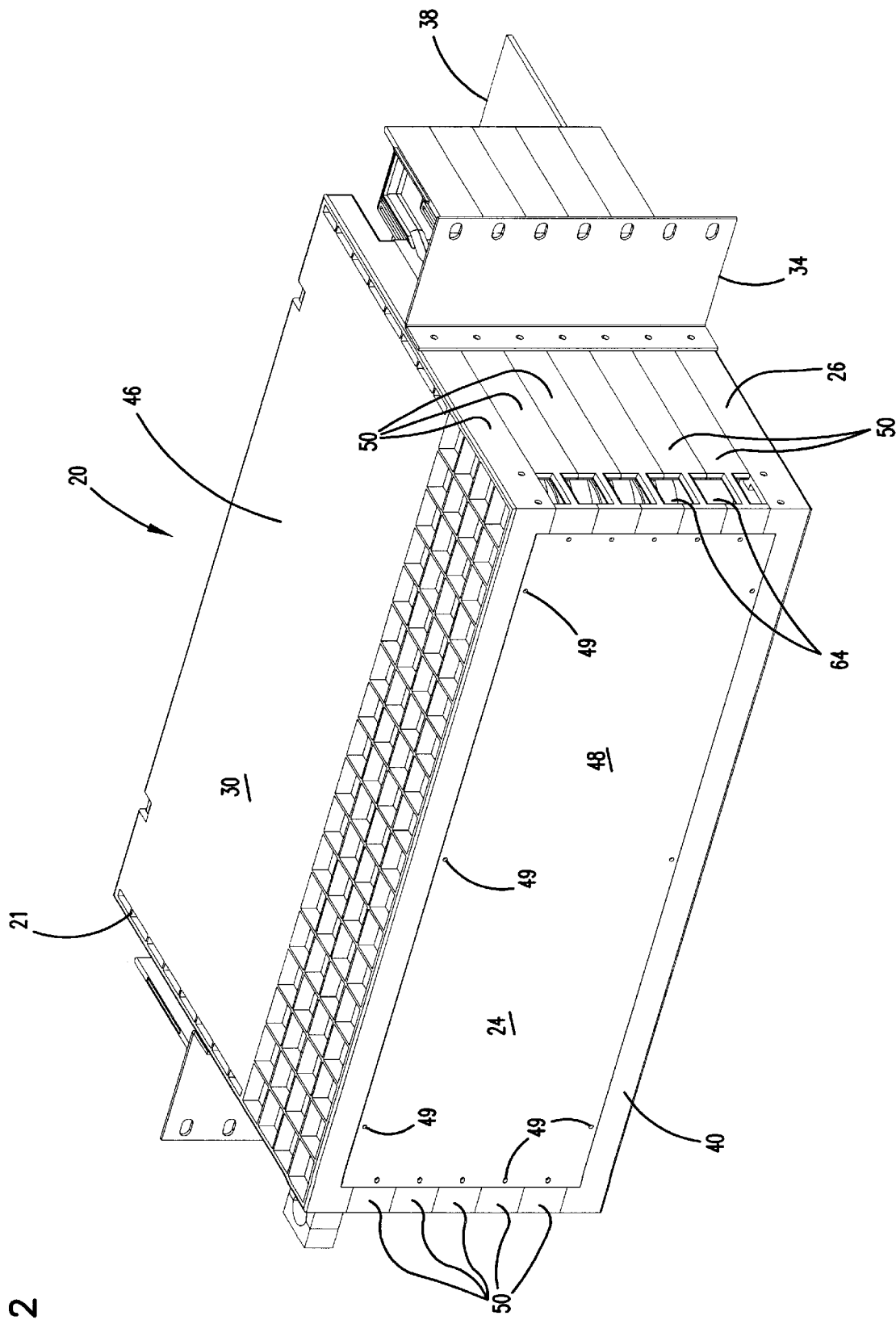
FIG. 2 is a back, top, and left side perspective view of the cable management device.
Figure 3:
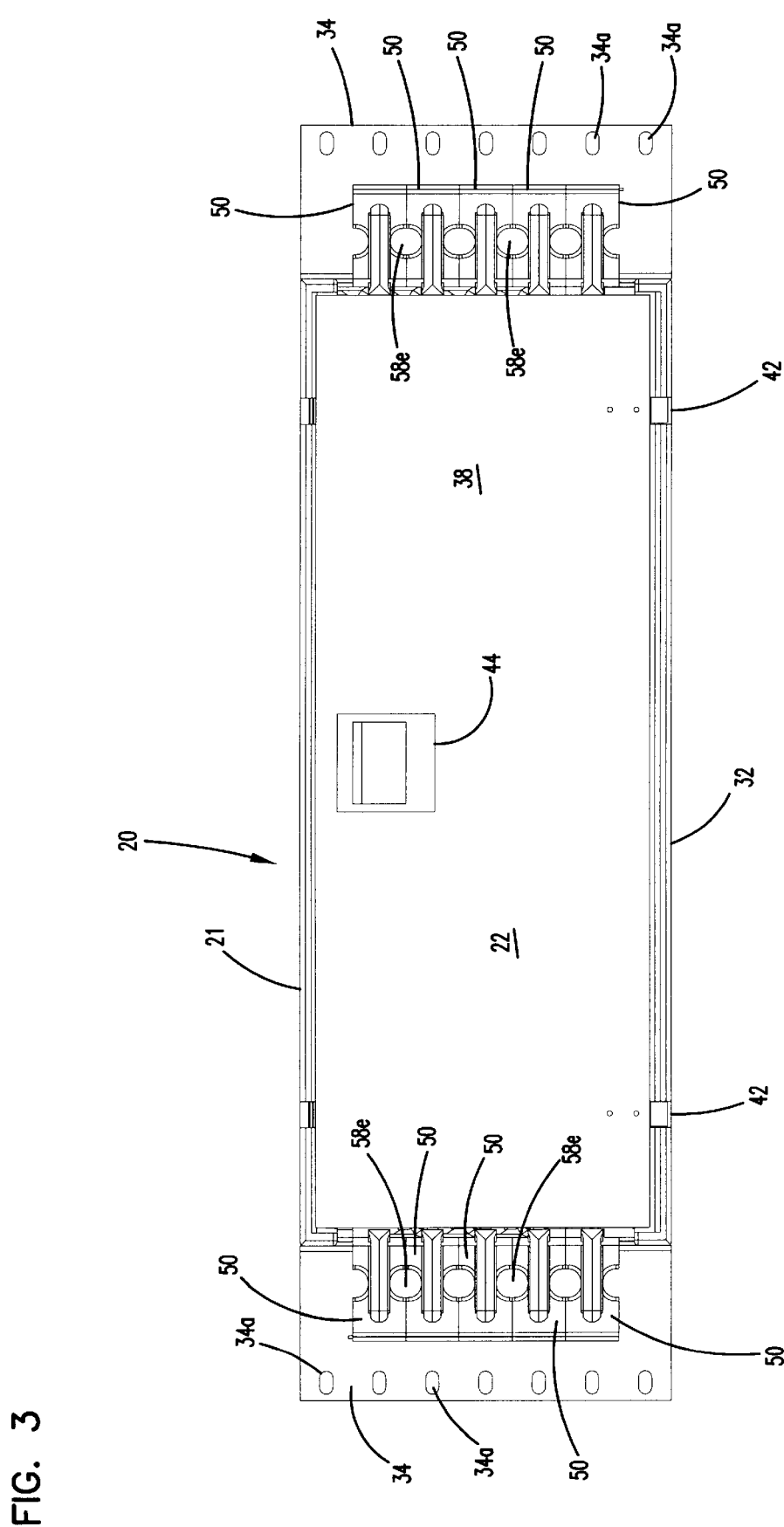
FIG. 3 is a front view of the cable management device.
Figure 4:
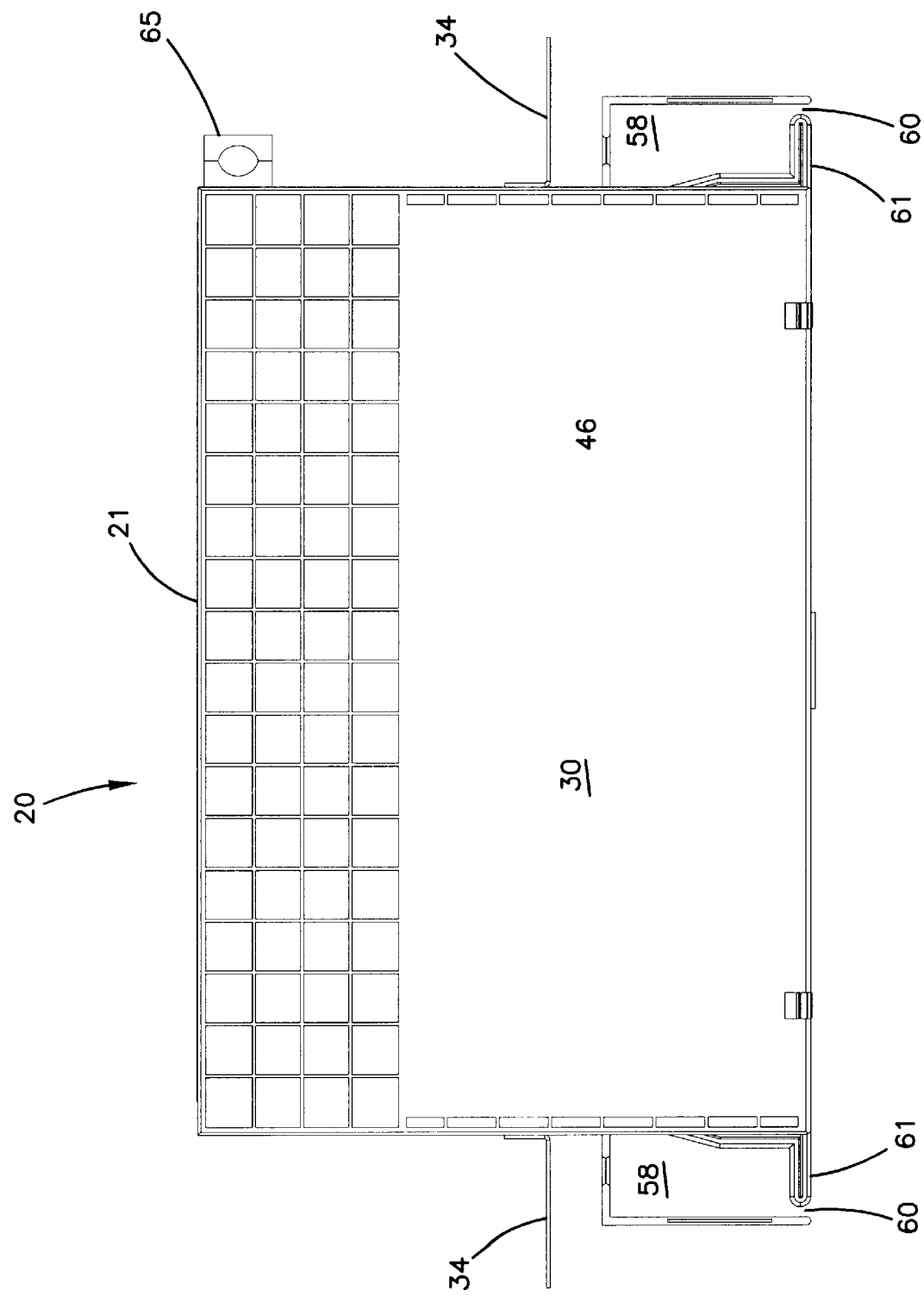
FIG. 4 is a top view of the cable management device.
Figure 5:
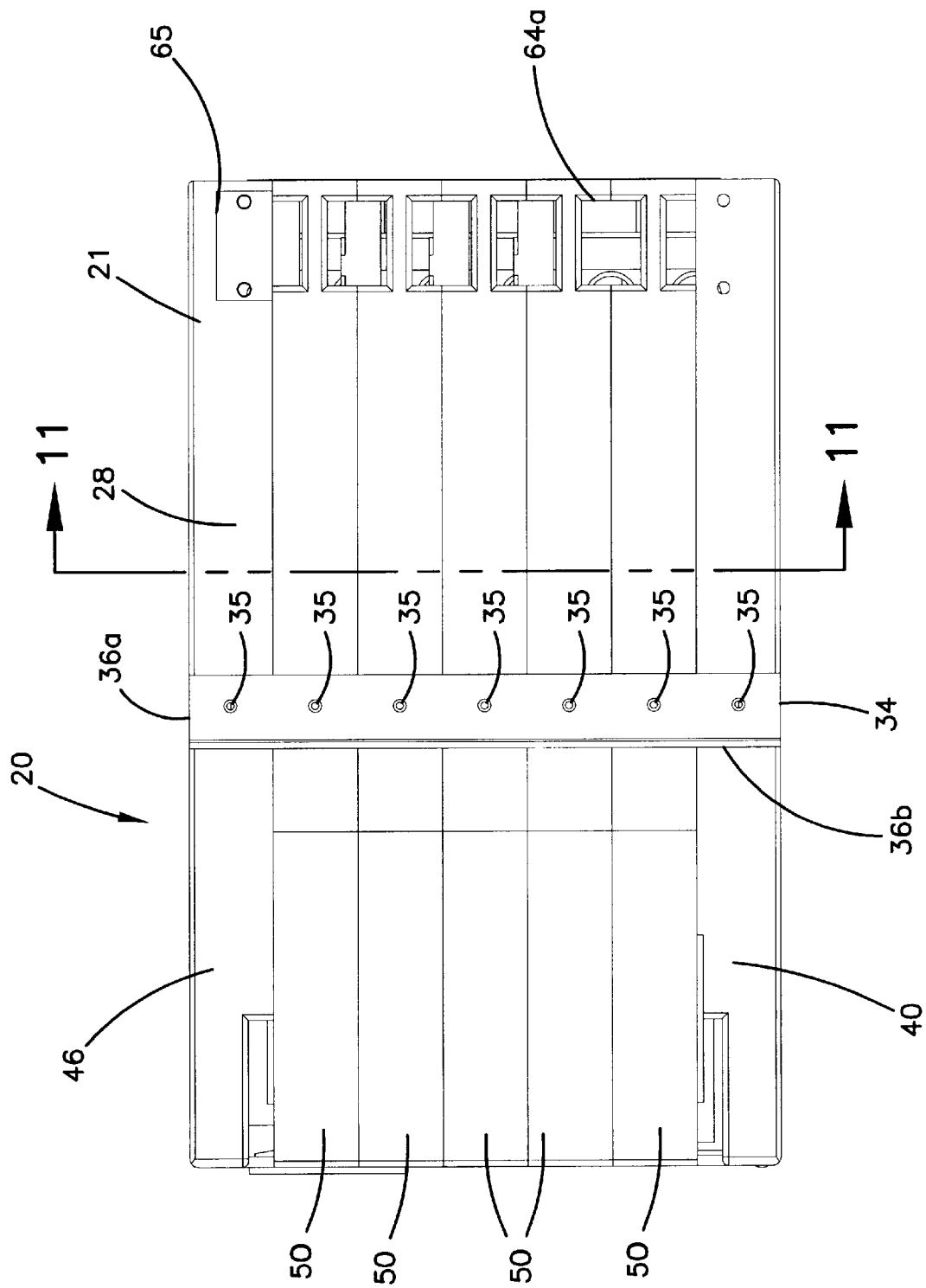
FIG. 5 is a right side view of the cable management device.
Figure 6:
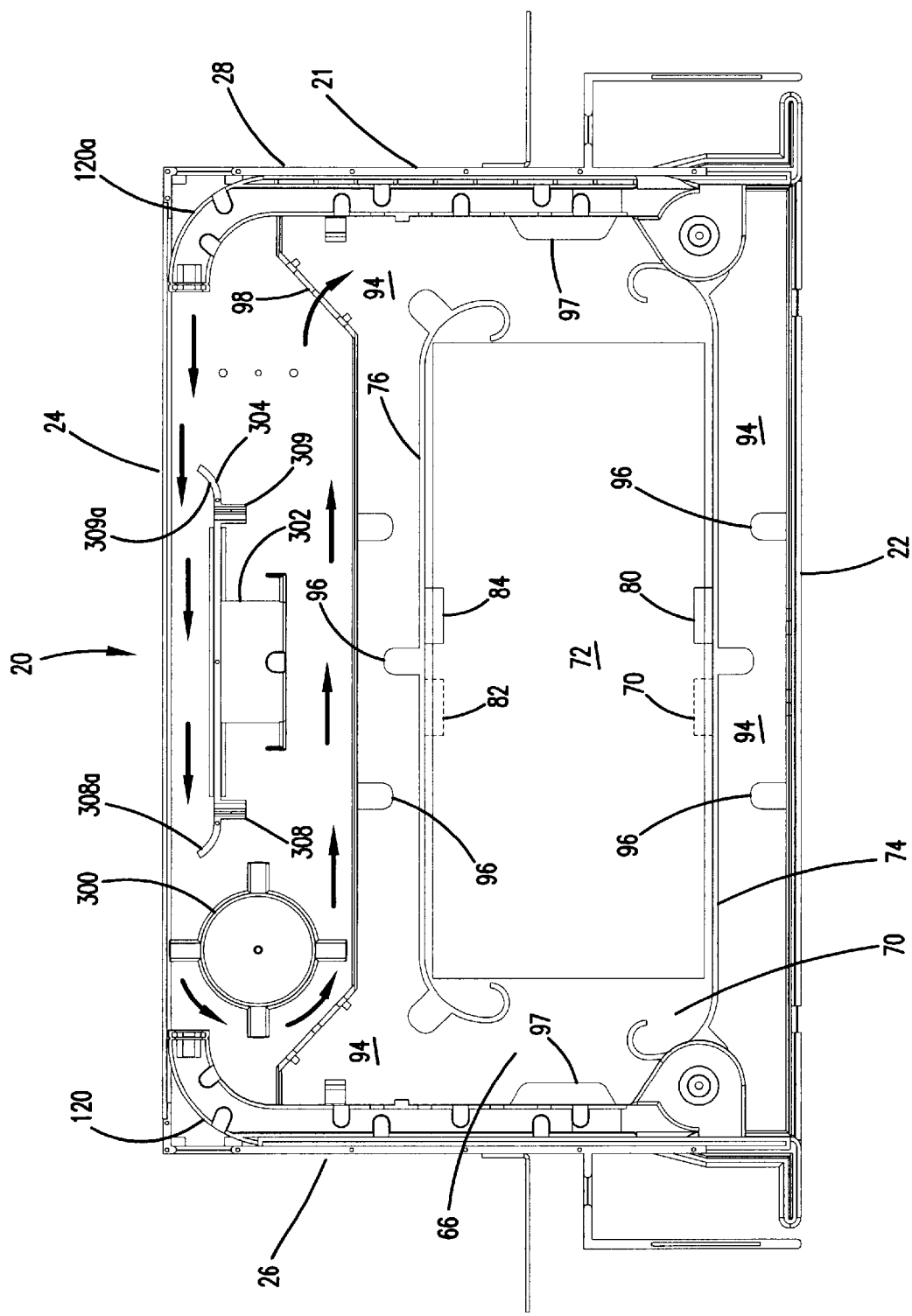
FIG. 6 is a top view of the cable management device without the top cover, and without the trays.

With reference to FIGS. 1–11, a cable management device 20 (hereinafter "device"), includes a housing 21 having a front 22, a back 24, a left side 26, a right side 28, a top 30, and a bottom 32. Device 20 allows for a trunk line, or other main line to enter device 20, and then each optical fiber cable can be spliced to individual connectors. The connectors are accessible within device 20 to connect each optical fiber cable to a distribution line or other line for routing to optical fiber signal transmission equipment. Device 20 include one or more splice and storage drawers 66, and one or more movable trays 170 configured as desired, such as for storage and termination, storage only, or for support of cable components necessary in the optical fiber signal transmission system.

Device 20 is mountable to a bay or other frame structure via brackets 34, including holes 34a along left and right sides 26, 28. A front cover 38 is hinged to a bottom cover 40 at hinges 42 to allow front access to an interior of device 20 where drawer 66 and trays 170 are stored. A latch 44 selectively latches front cover 38 to a top cover 46. Device 20 also allows side entry of the trunk line or lines (optical fiber cables) to device 20, and side exit of the distribution line or lines (optical fiber cables) from device 20. While various cable connectors and cable components are shown in the FIGS., actual cables have not been specifically shown in order to make the FIGS. more easily understood. In some of the FIGS. the cables have been indicated with arrows.

With reference to FIGS. 1–3, 5, 7, and 11–16, sides 26, 28 of device 20 are formed by a plurality of separate side wall members 50, which are preferably all identical pieces. Side wall members 50 can be made from molded plastic. As shown in FIGS. 1–3, 5, 7, and 11, for example, side wall members 50 are stacked to form each side 26, 28. In the embodiment shown, side wall members 50 are held together via a plurality of vertically extending pegs 52 and reciprocally shaped recesses 54 on the top and bottom edges of each side wall member 50 (see also FIGS. 12–16). Adhesive can be utilized to permanently mount the side wall members 50 together to form each side 26, 28. Snaps or an interference fit can also be used.

Each side wall 50 has a projecting loop 56 defining a cableway 58. A gap 60 in loop 56 allows for insertion and removal of cables in each cableway 58. A front post 61 of loop 56 has a rounded cross-section. Notches 62 at a back end of each side wall member 50 form gaps 64 to allow for cable access at a rear of device 20. The trunk cable can enter device 20 through gap 64a. A trunk cable clamp 65 mounted at holes 65a of the top cover 46 is useable to secure the trunk cable to device 20. To further facilitate secure mounting of side wall members 50, each loop has a tongue 52a and a corresponding groove 54a. Top cover 46 and bottom cover 40 mount to sides 26, 28 via a similar peg 52 and recess 54 system, preferably held together by adhesive, snaps or interference fit. A back cover 48, such as a metal plate, mounts with fasteners through holes 49 into holes 51 in side wall members 50, top cover 46, and bottom cover 40. Back cover 48 is removable, as desired, by removing the fasteners. Because the side wall members 50 are identical on both sides 26, 28 of device 20, pegs 52 face upwardly on side 26 and downwardly on side 28.

Each side wall member 50 includes two front notches 58a, 58b defining cable exit pathways for cable exiting device 20 into cableway 58. Cableway 58 further includes rear notches 58c, 58d for defining rear exits 58e from cableway 58 as desired, such as for cables and connectors, or for insertion of a tool to access brackets 34 if holes 34a are disposed behind loop 56, rather than projecting beyond as in the embodiment shown. Brackets 34 mount to device 20 with fasteners 35 through first flange 36a. To change the size of device 20 to mount to a smaller frame, brackets 34 can be reversed so that the fasteners 35 mount second flange 36b to the device.

As will be described below, each side wall member 50 includes a side rail 104 defining opposite facing channels 102a, 102b, each including a front and rear stop 106, 108 at a front and a rear of channels 102a, 102b. Channels 102a, 102b of adjacent side wall members 50 form a channel 102.

Figure 7:
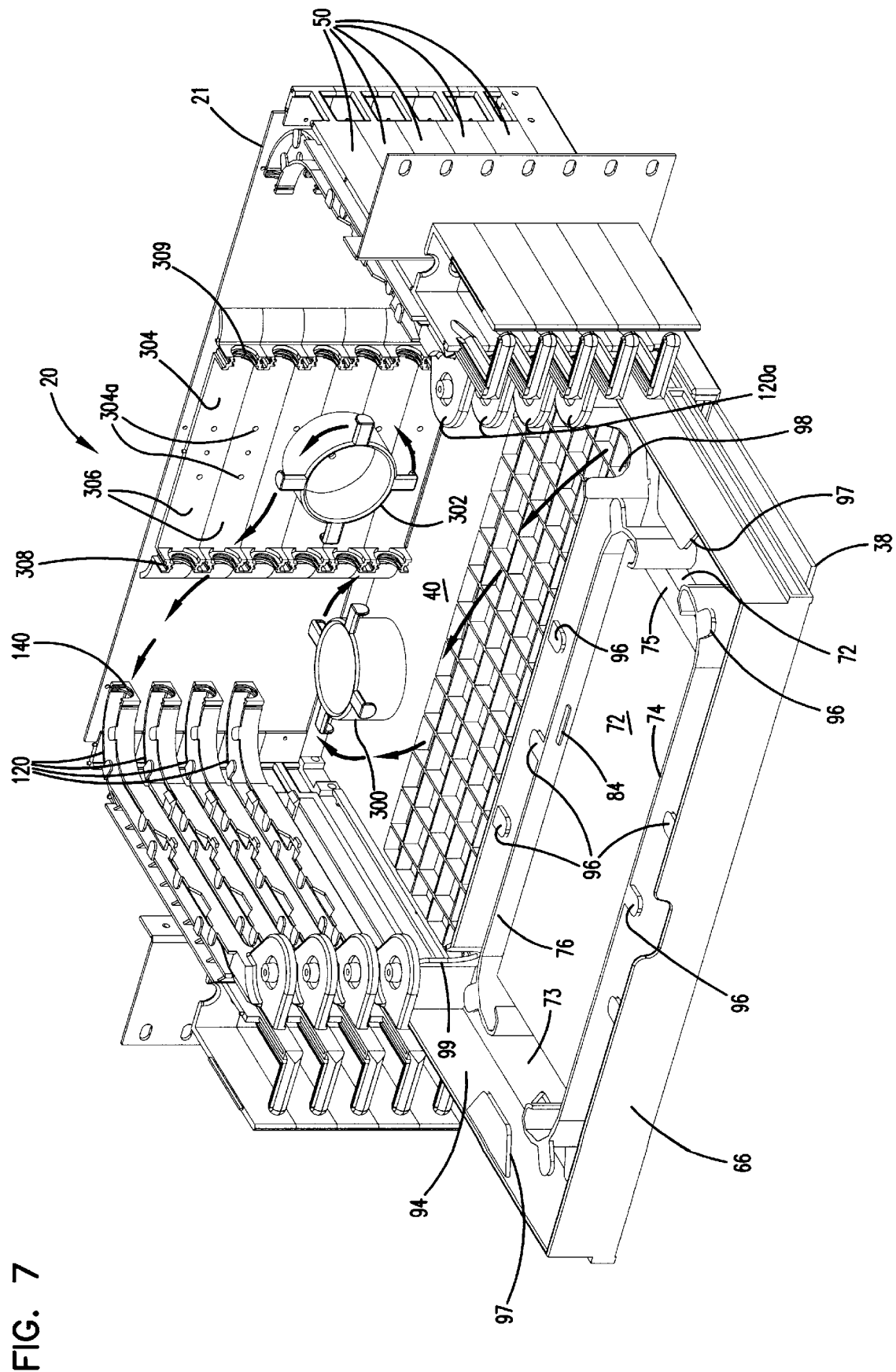
FIG. 7 is a perspective view like the view of FIG. 1, and showing the device without the top cover, without the trays, and with the front cover open and the drawer in an extended position.
Figure 22:
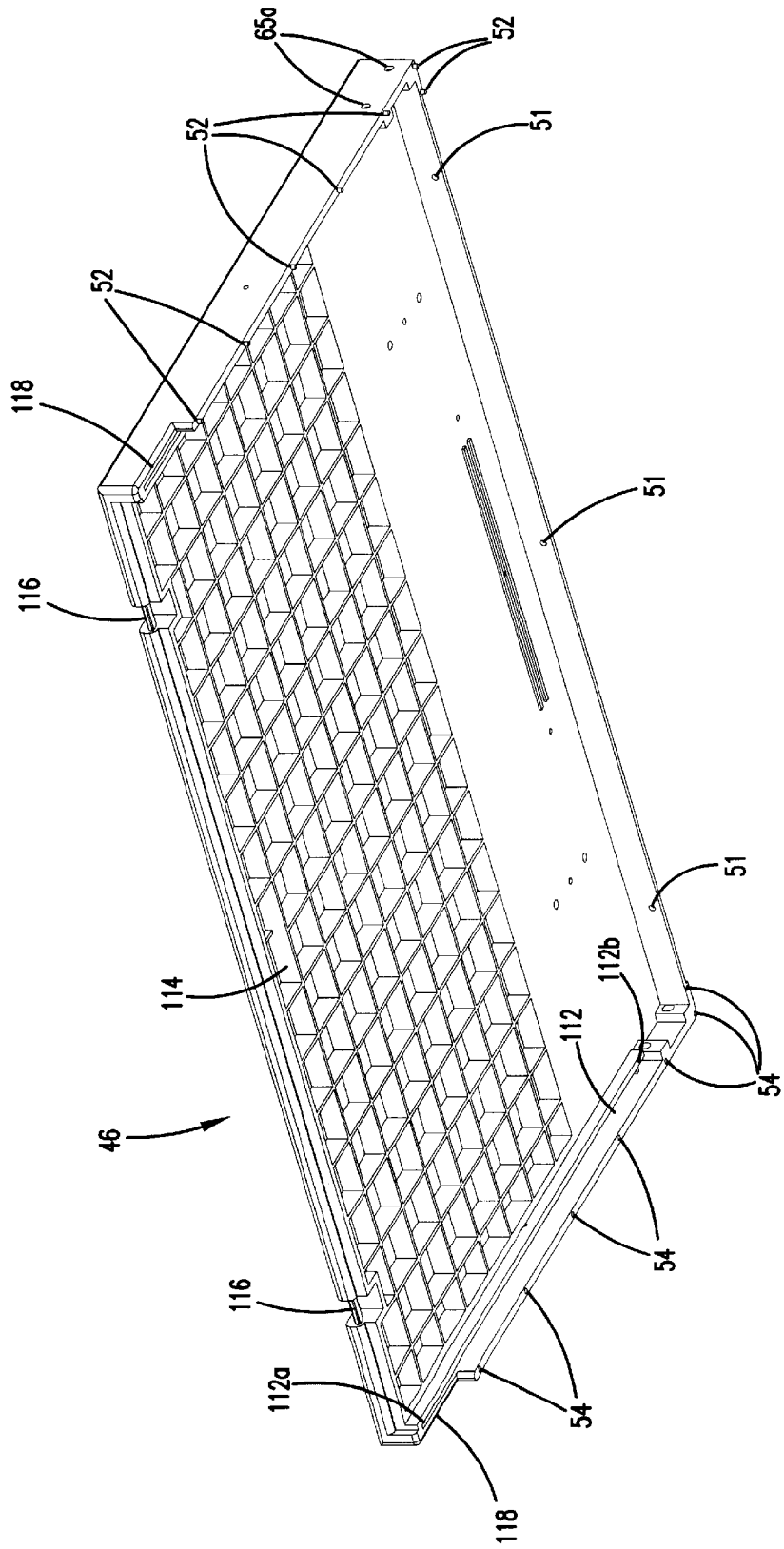
FIG. 22 is a bottom perspective view of the top cover.
Figure 27:
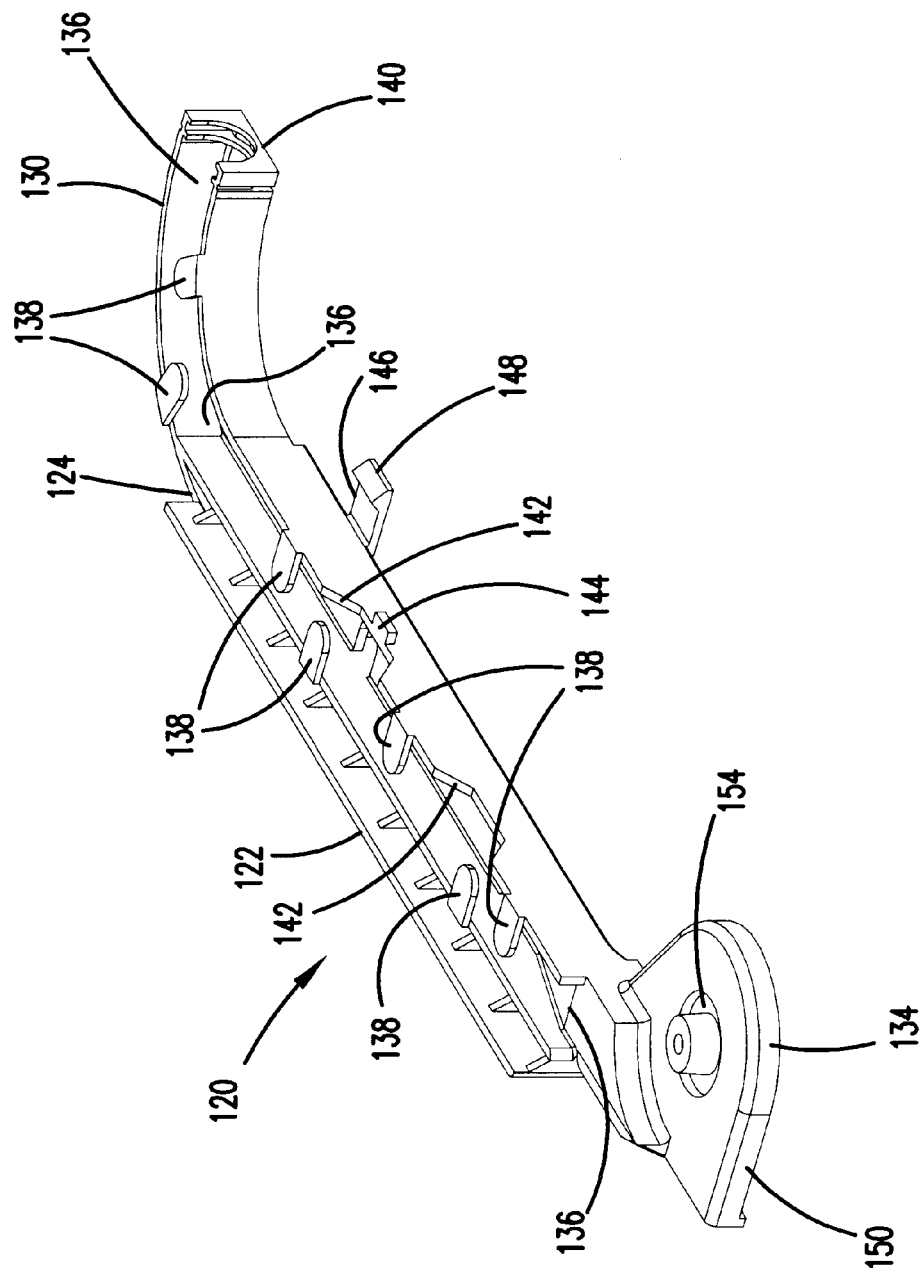
FIG. 27 is a top perspective view of one of the left side sliding pivot members of the device of FIG. 1, the right side sliding pivot members being a mirror image.
Figure 28:
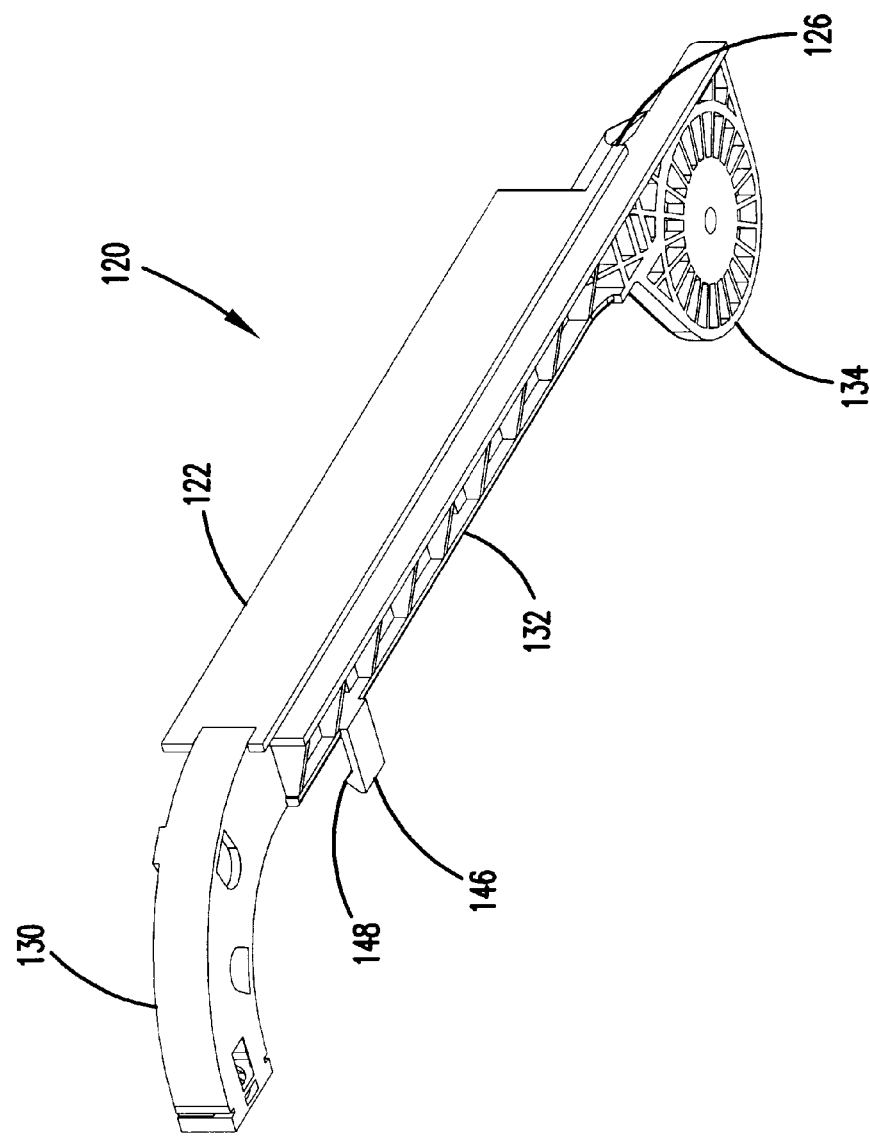
FIG. 28 is a bottom perspective view of the sliding pivot member.

With reference to FIGS. 6–8, 11, and 17–20, device 20 is shown to include a drawer 66 slideably moveable relative to device 20. In the embodiment shown, drawer 66 is a splice and storage drawer and includes two side rails 68, each formed as two ribs 68a, 68b, slideably received within a side channel 29 (see FIG. 11) of each side 26, 28 of device 20. Side recess 29 is formed by bottom cover 40 and the lowermost side wall members 50 of each side 26, 28. Drawer 66 includes a center region 70 for receipt of a plurality of stacked (and removable) splice trays 72 (two are shown in FIG. 7). Drawer 66 includes two upstanding separator walls 74, 76. Separator walls 74, 76 are separated by cable access gaps 73, 75. Offset securing tabs 78, 80 on upstanding wall 74, and offset securing tabs 82, 84 of upstanding wall 76 cooperate to releasably secure two splice trays 72 within center region 70. Separator walls 74, 76 cooperate with upstanding drawer walls 86, 88, 90, 92 to define a cable storage pathway 94 in which cable can be wrapped around center region 70, as desired. Cable tabs 96, 97 positioned over storage pathway 94 help maintain the cable in storage pathway 94. Access to drawer 66 for the cables is via rear notch 98. A second notch 99 is provided on an opposite side of drawer 66. Side wall member 50a (see FIG. 11) includes a channel 102b on a lower side of rail 104. The two stops 106, 108 at each end of a flange 110 of side rail 68 rides in channel 102b of side wall member 50a. Side wall member 50a limits drawer 66 from being removed from device 20 or being inserted too far into device 20. Bottom cover 40 also includes a channel 112, with front and rear stops 112a, 112b, respectively (see FIG. 22) for cooperating with flange 110 in a similar manner as stops 106, 108. Front wall 86 includes a finger notch 86a to facilitate opening of the drawer. Drawer 66 can be made from molded plastic.

Top cover 46 is shown in FIGS. 1, 2, 4, 10 and 21–26. Preferably bottom cover 40 shown in FIGS. 1, 2, 5, and 7, for example, is identically configured as top cover 46, but in an inverse vertical orientation. Thus a cost savings results in that identical parts can be utilized for assembly of top and bottom covers 46, 40 of device 20, and also side wall members 50 as noted above. Top cover 46 includes a center recess 114 for receipt of latch 44 when front cover 38 is in the closed position. Top cover 46 illustrates the two hinge pins 116 used on bottom cover 40 to form hinges 42 of device 20. Preferably, hinge pins 116 define rectangular shapes for cooperating with a removable hinge which facilitates rotation of front cover 38 for a significant portion of rotation of front cover 38 relative to a remainder of device 20, but allows for removal of front cover 38, if desired. Each of top and bottom covers 46, 40 includes a front notch defining a cable exit pathway like front notches 58a, 58b of side wall members 50. Each of top and bottom covers 46, 40 can be made from molded plastic.

With reference to FIGS. 6–11 and 27–32, device 20 is shown to further include a plurality of sliding pivot members 120, 120a which are slideably mounted to side wall members 50. Sliding pivot members 120, 120a are identical, but are mirror images of each other for each of the left and right sides of device 20. A description of sliding pivot members 120 will therefore suffice as a description of sliding pivot members 120a. Referring now to FIGS. 27–32, a side rail 122 of sliding pivot member 120 is received within a channel 102 of two adjacent side wall members 50. A rear stop 124 and a front stop 126 engage stops 108, 106, respectively of channel 102 to confine each sliding pivot member 120 to a range of limited motion between a retracted position (FIGS. 6–8) and an extended position (FIGS. 9 and 10), and to prevent removal. Each sliding pivot member 120 includes a curved rear end 130, a straight portion 132 and a front hinge portion 134. A cable pathway 136 extends from curved rear end 130 through straight portion 132. Tabs 138 help maintain cables positioned within cable pathway 136 during use. End 140 defines a corrugated tube gripping recess. Side recesses 142 defines a convenient location for manual insertion of one or more cables into cable pathway 136. Sliding pivot member 120 includes a tray stop 144 for limiting rotation of tray 120, and a tray support 146 includes a locking tab 148 for locking the tray next to sliding pivot member 120. Front plate 150 at front hinge portion 134 of sliding pivot member 120 defines a tray hinge support 154, and a central opening 156 for receipt of a fastener. Preferably, sliding pivot members 120, 120a are made from molded plastic.

Figure 8:
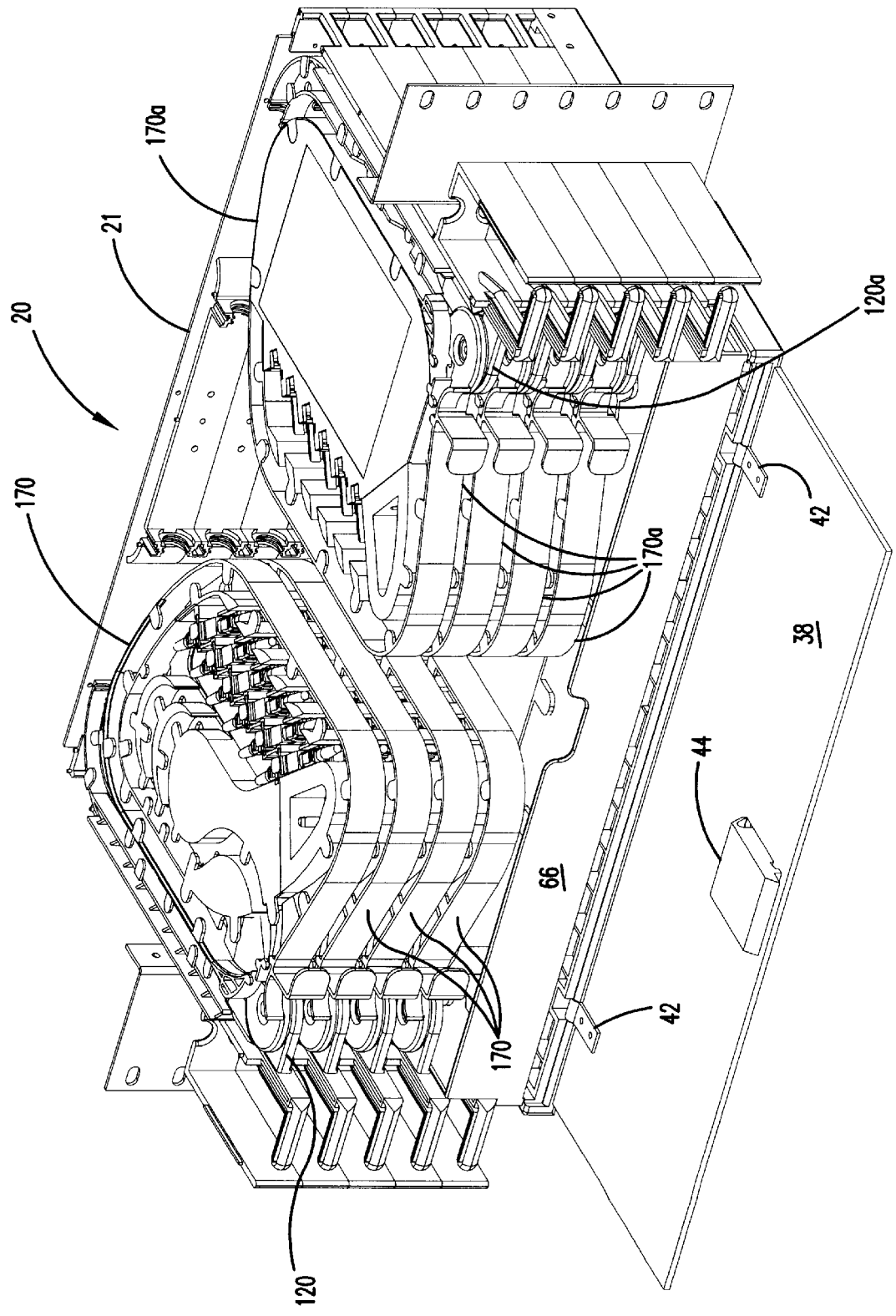
FIG. 8 is a perspective view of the device as in FIG. 7, showing all of the trays in the retracted positions, and showing the drawer in the retracted position.
Figure 9:
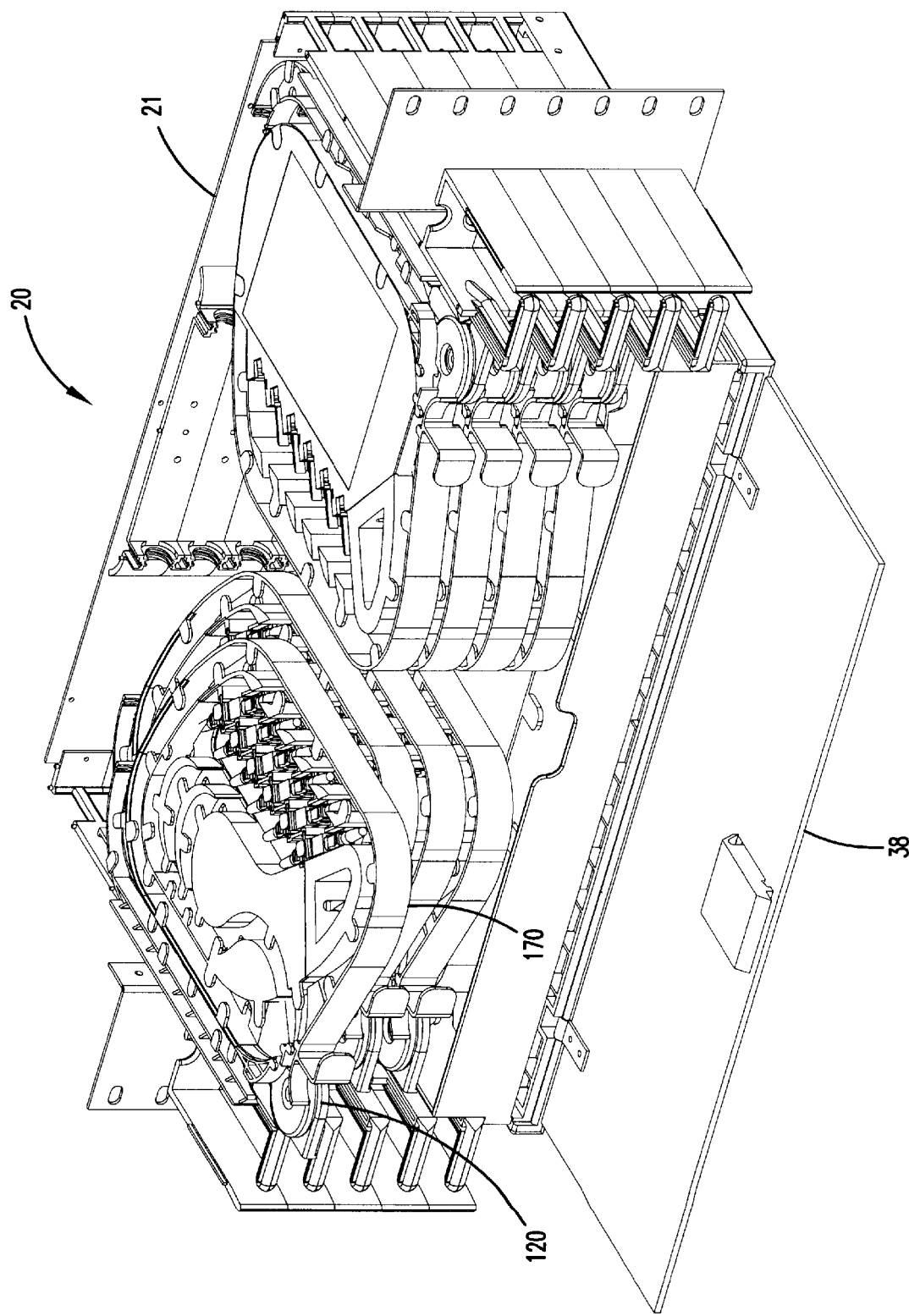
FIG. 9 is a perspective view like the view of FIG. 8, and showing one tray in the partially extended position after the tray has been slid outwardly relative to the device.
Figure 10:
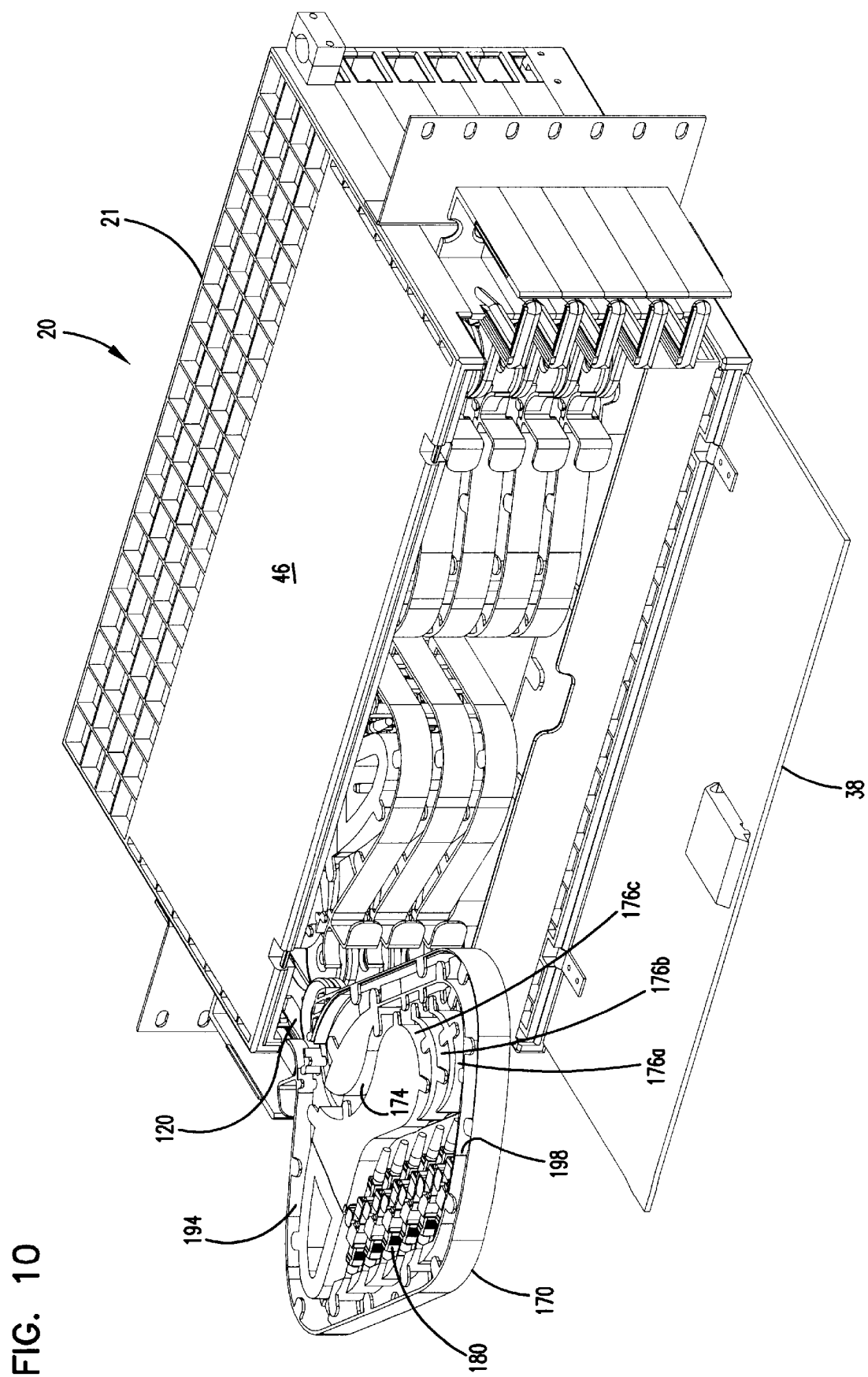
FIG. 10 is a perspective view like the view of FIG. 9, and showing the tray in the fully extended position after the tray has been rotated relative to the device.
Figure 11:
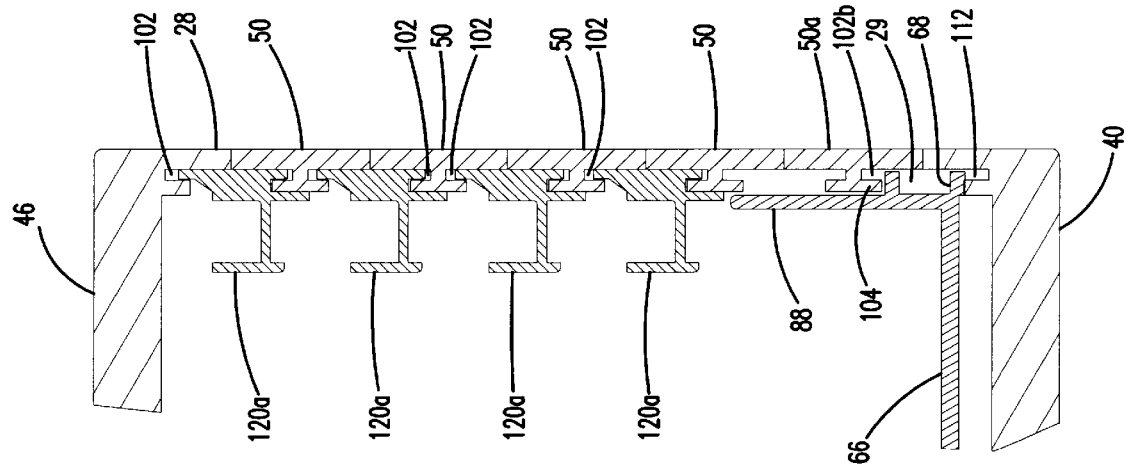
FIG. 11 is a cross-sectional side view of a portion of the device taken along lines 11—11 of FIG. 5 through the side wall of the device.
Figure 12:
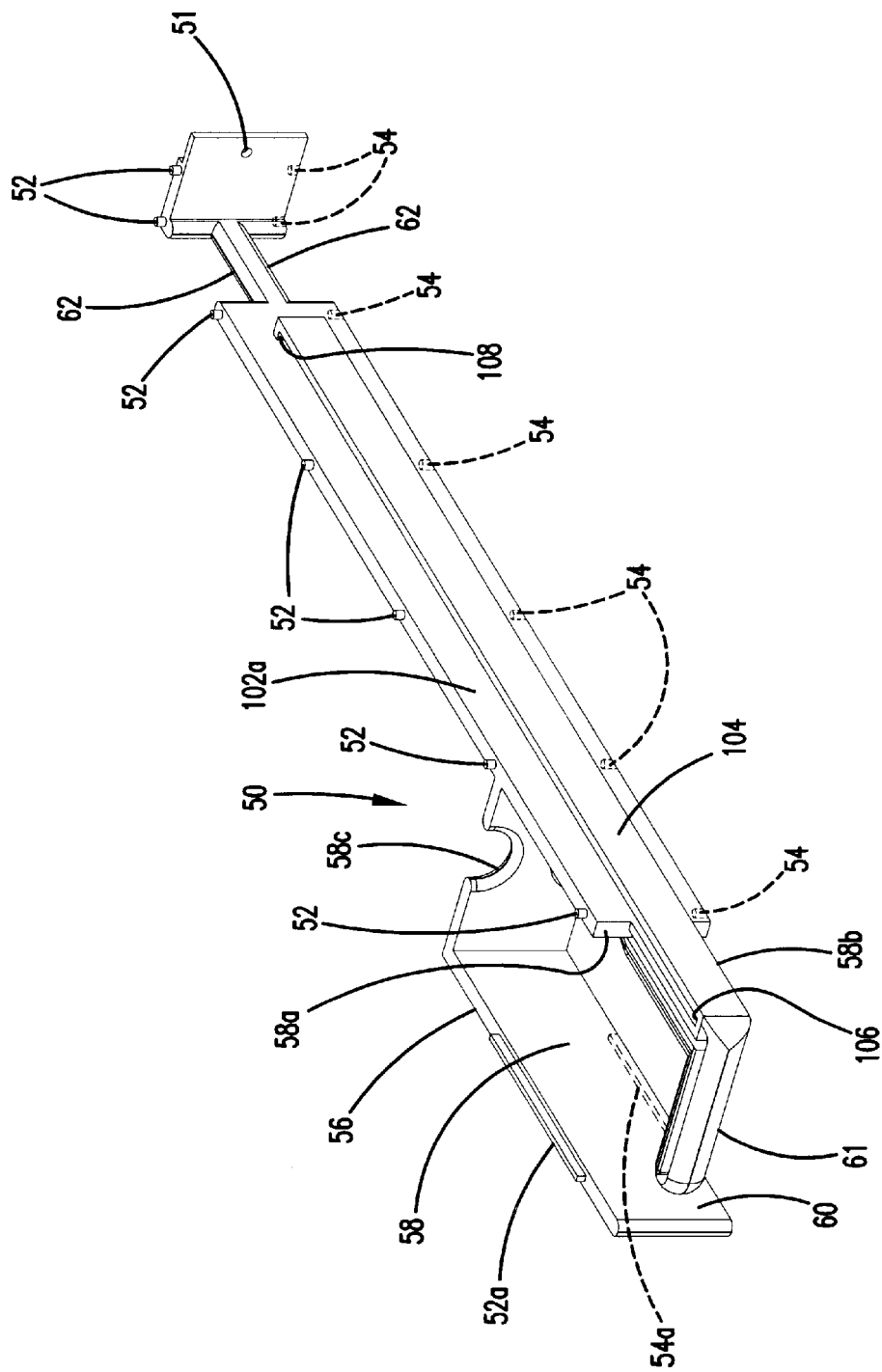
FIG. 12 is a top perspective view of one of the side wall members of the device of FIG. 1.
Figure 15:
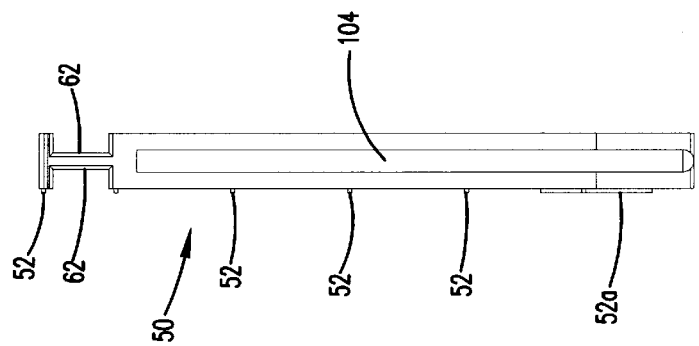
FIG. 15 is a side view opposite to the side view of FIG. 13 of the side wall member.
Figure 16:
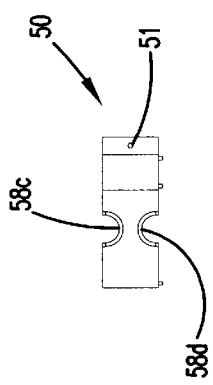
FIG. 16 is a back end view of the side wall member.
Figure 14:
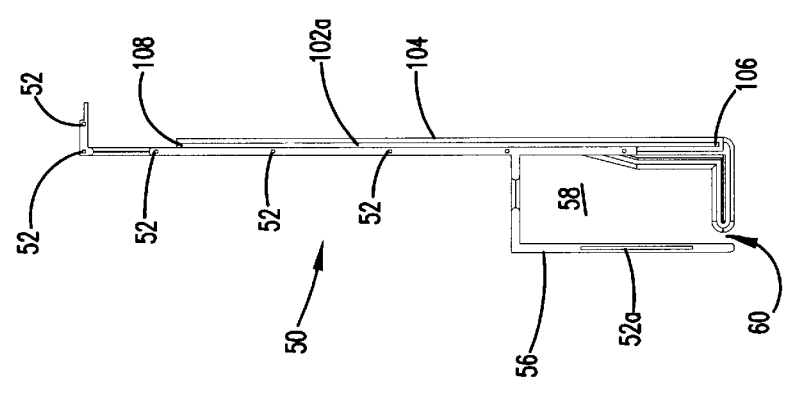
FIG. 14 is a top view of the side wall member.
Figure 13:
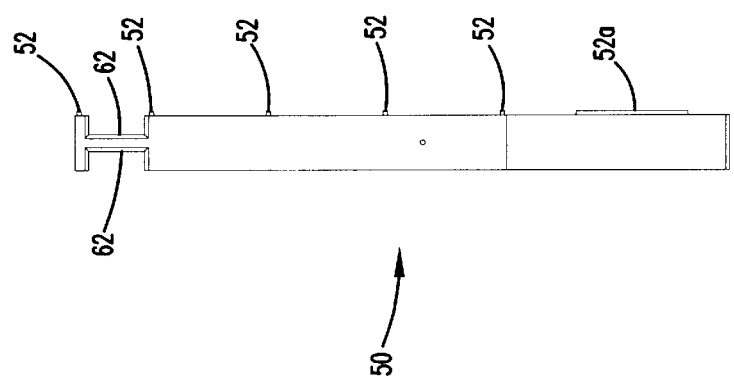
FIG. 13 is a side view of the side wall member.
Figure 20:
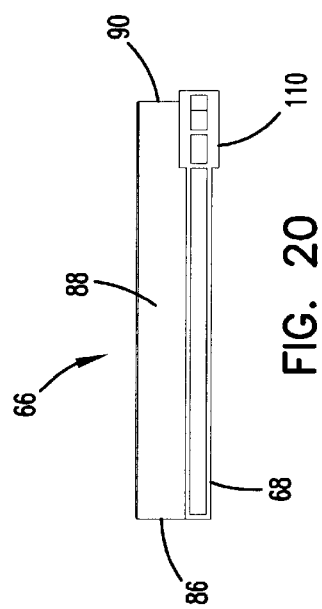
FIG. 20 is a right side view of the drawer.
Figure 18:
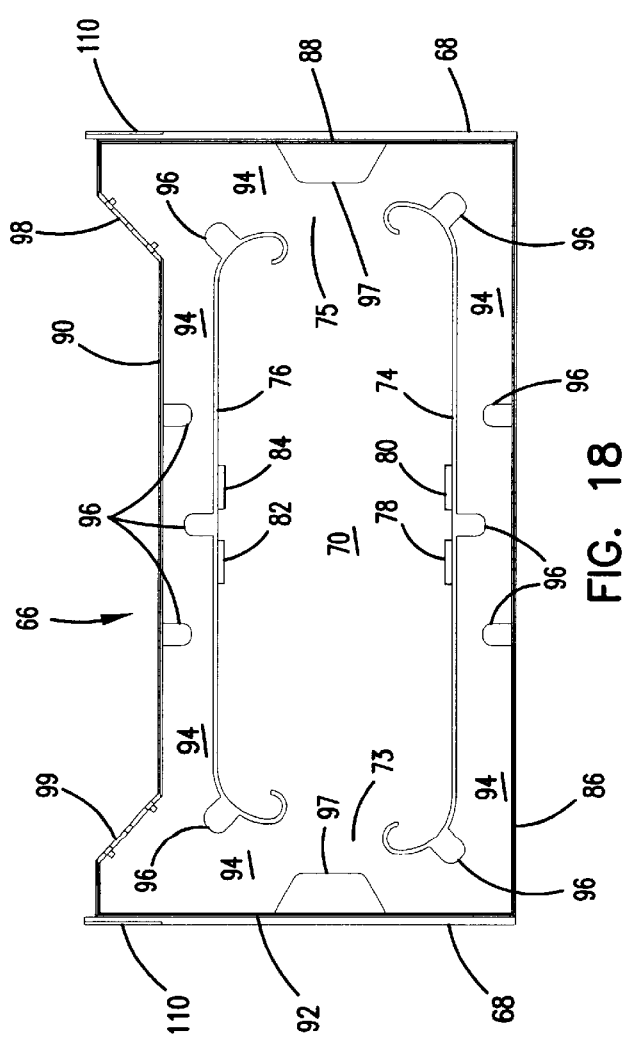
FIG. 18 is a top view of the drawer.
Figure 19:
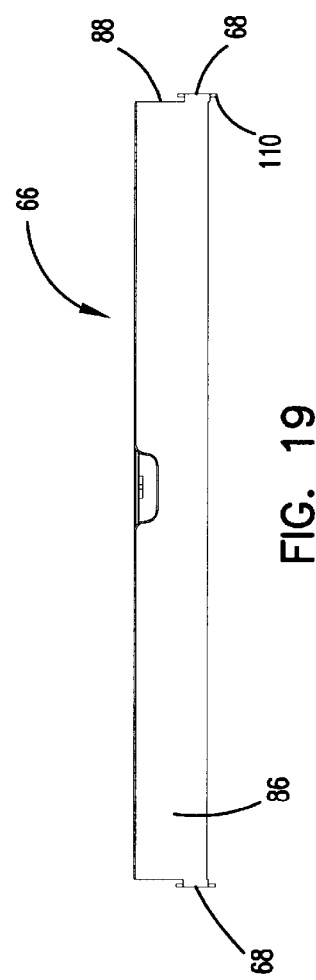
FIG. 19 is a front view of the drawer.
Figure 21:
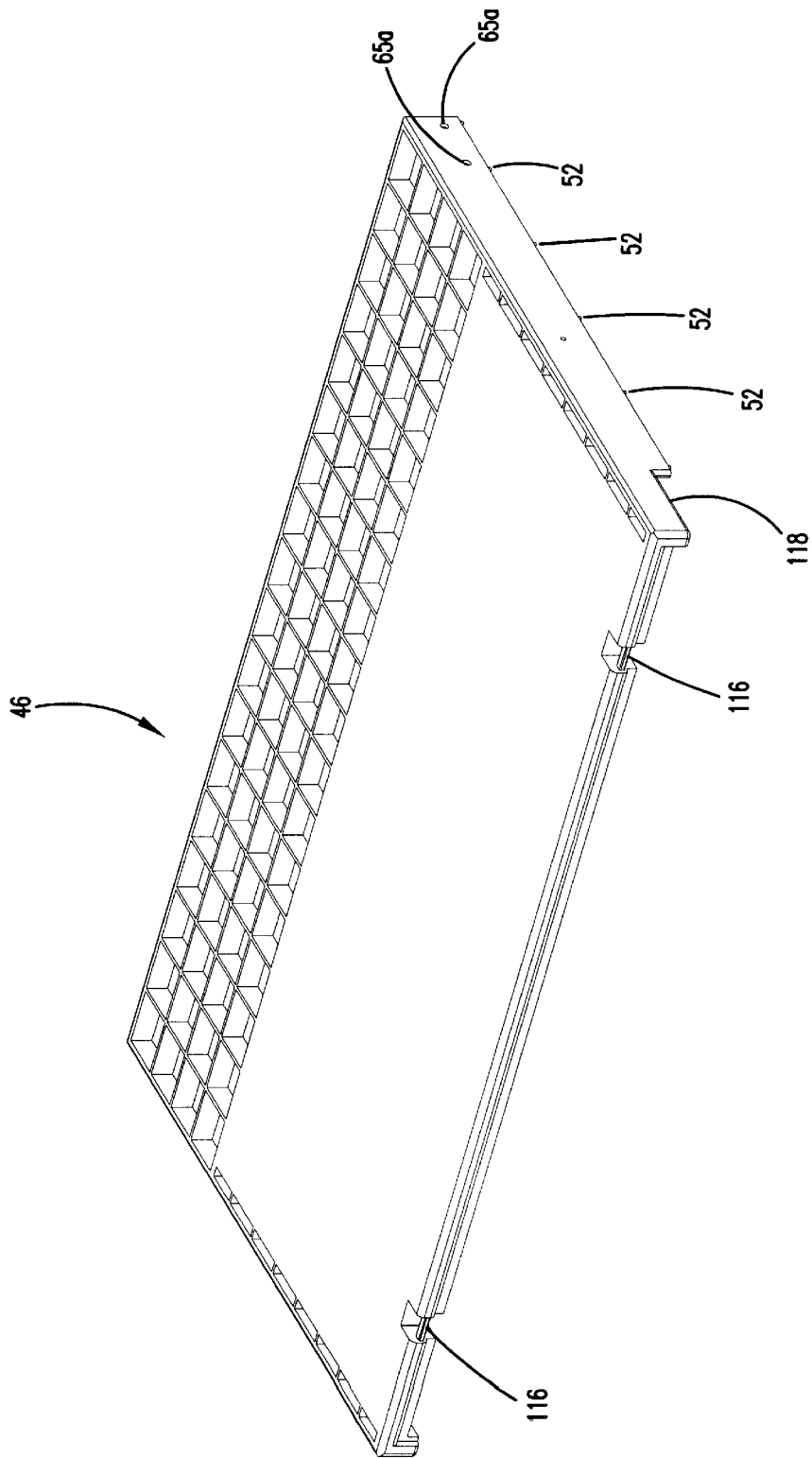
FIG. 21 is a top perspective view of the top cover, the bottom cover being identical thereto of the device of FIG. 1.
Figure 33:
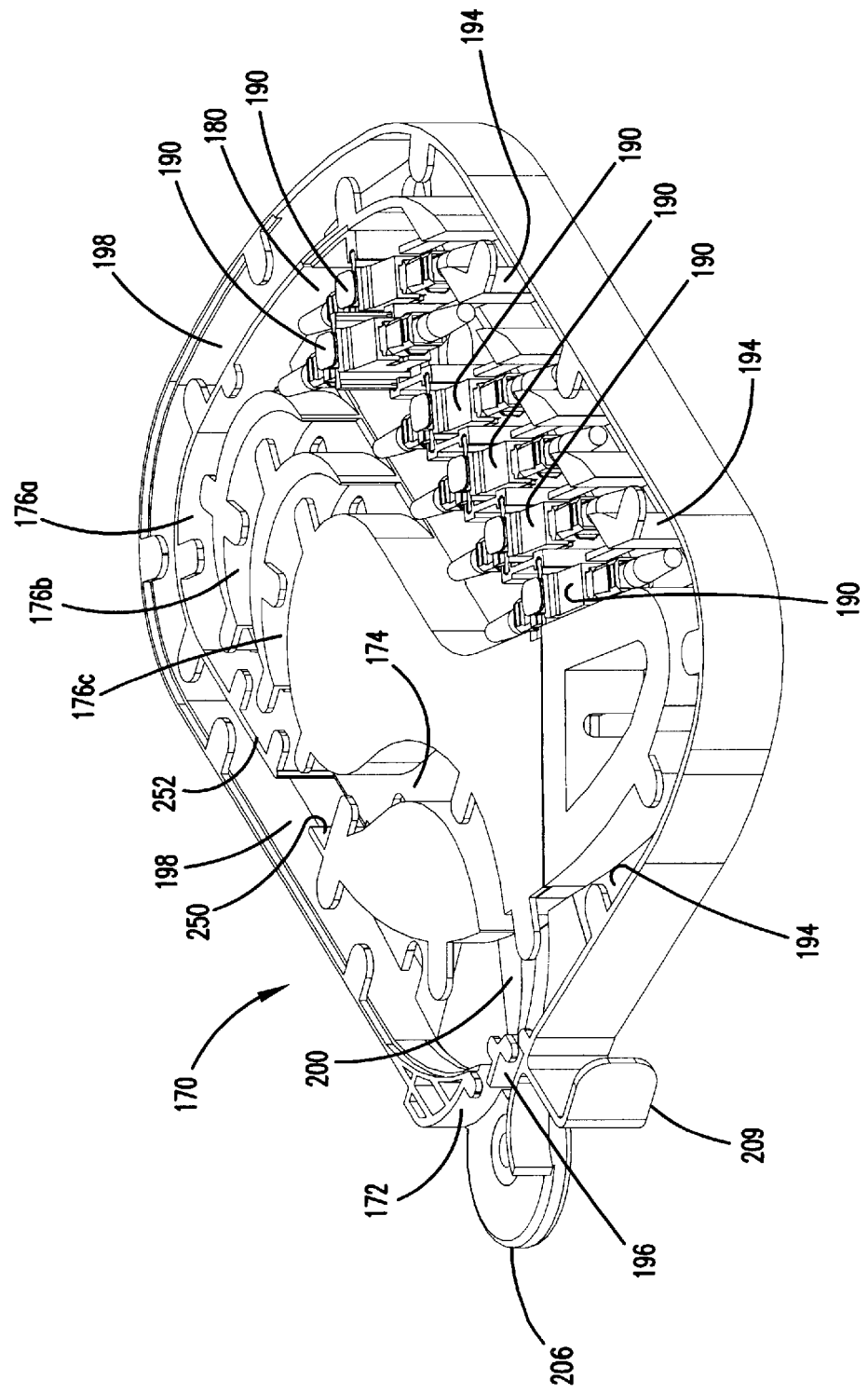
FIG. 33 is a top perspective view of one of the left side trays of the device of FIG. 1 including both termination and storage capability, the right side termination and storage trays being a mirror image.
Figure 34:
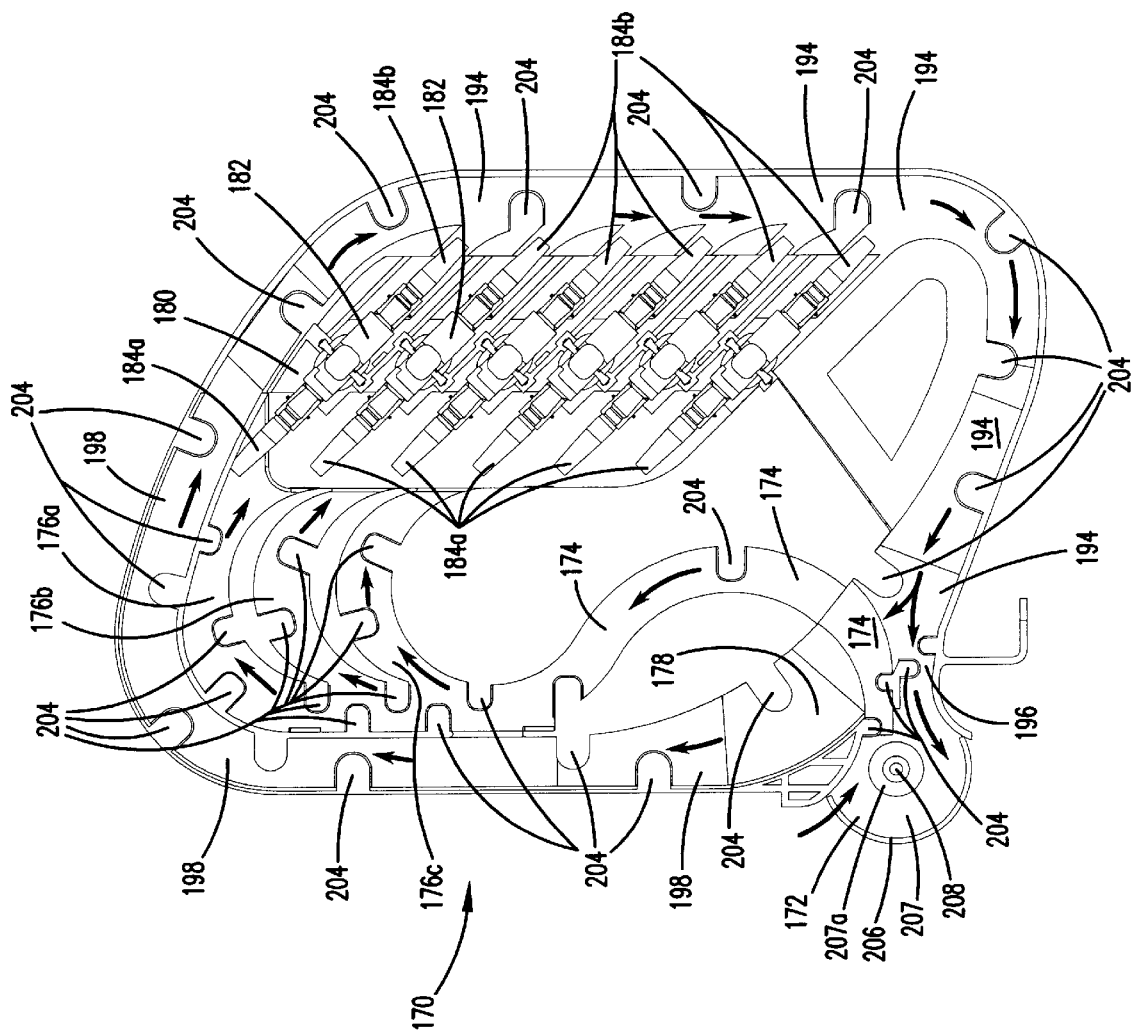
FIG. 34 is a top view of the tray of FIG. 33.
Figure 35:
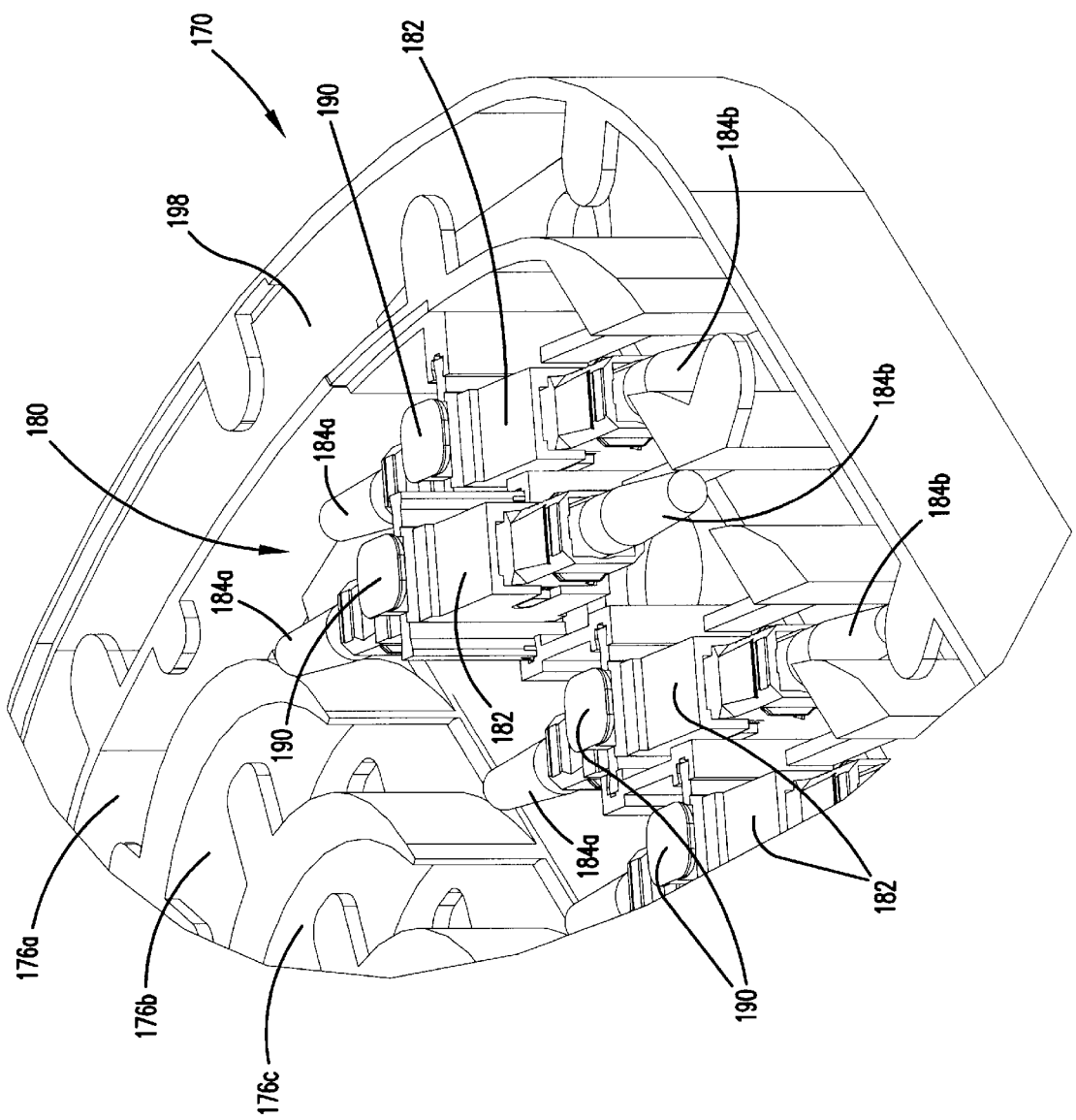
FIG. 35 is an enlarged perspective view of a portion of the bulkhead area of the tray of FIG. 33.

Each sliding pivot member 120, 120a of device 20 has mounted to it a pivotally moveable tray 170, 170a shown with device 20 in FIGS. 8–10. Each tray 170, 170a can be configured in a plurality of different manners, depending on the needs of the cable management system. FIGS. 33–35 illustrate tray 170 configured for termination and storage. Trays 170 are usable on a left side of device 20; trays 170a are usable on the right side. A description of tray 170 will suffice for the features of trays 170, 170a which are a mirror image. As noted above, and as will be discussed below, the individual trays 170, 170a can be configured in a variety of different manners to perform different functions in device 20.

During use, a cable with one or more optical fibers enters termination and storage tray 170 from cable pathway 136 of sliding pivot member 120 at an entry point 172 and travels through a cable pathway 174 which is interconnected to three different cable termination pathways 176a, 176b, 176c. The optical fibers terminate at a bulkhead area 180 with a plurality of connectors 184a and adapters 182. Connectors 184b extend from adapters 182 and link further optical fibers that will exit tray 170, and exit device 20. Each adapter 182 is slideably mounted within bulkhead area 180 via a sliding adapter collar 188 which together with the adapter 182 forms a sliding adapter assembly 190 (see FIGS. 35–40). This allows access to individual adapters 182 in order to connect or disconnect a connector 184a, 184b to or from an adapter 182. Preferably, adapters 182 are staggered and at an angle to the front and sides of device 20 in the retracted position of tray 170. Cables extending from bulkhead area 180 enter cable pathway 194 for exiting tray 170 at an exit point 196.

Figure 47:
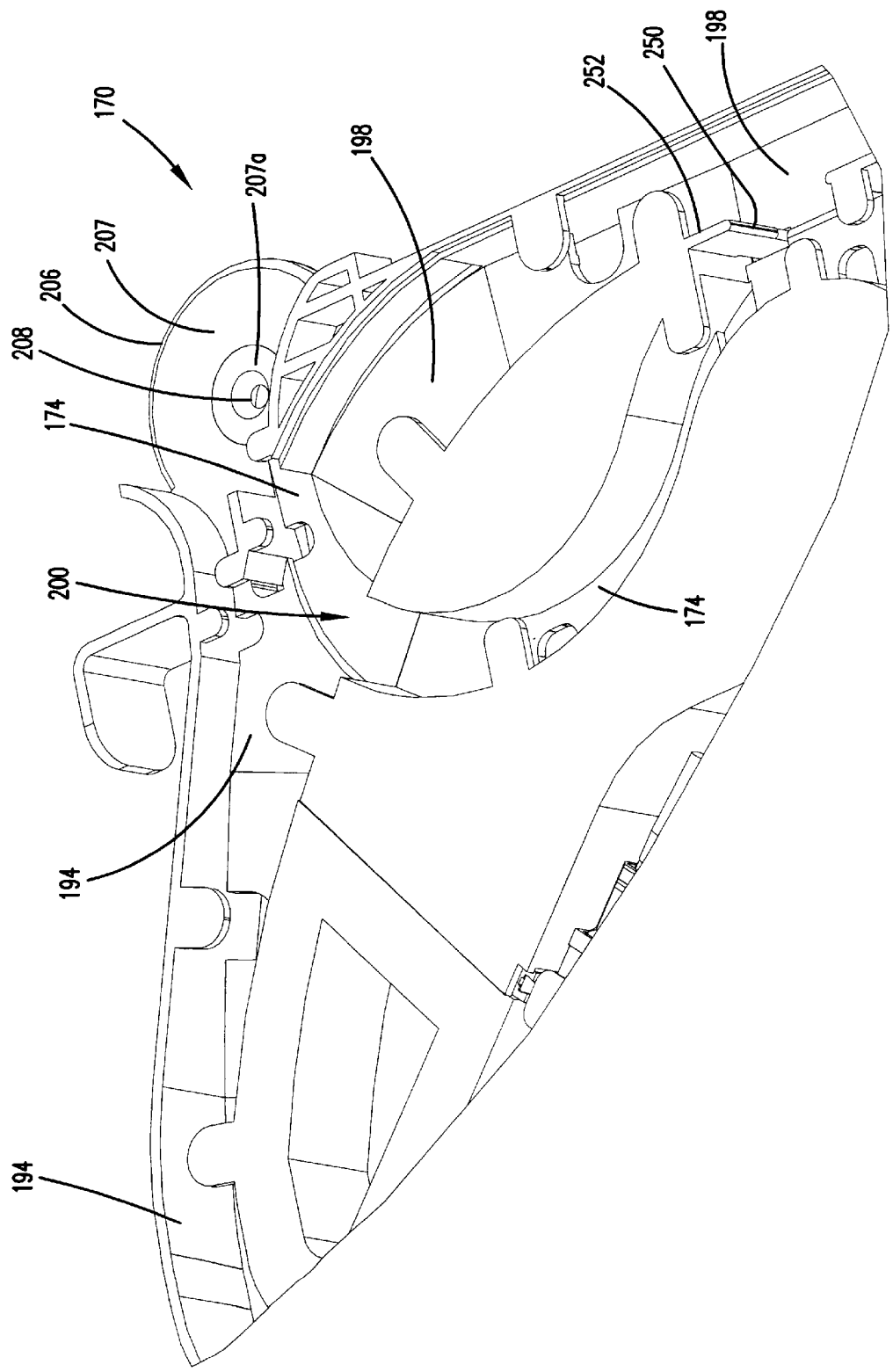
FIG. 47 is an enlarged perspective view of a portion of the tray of FIG. 33.
Figure 48:
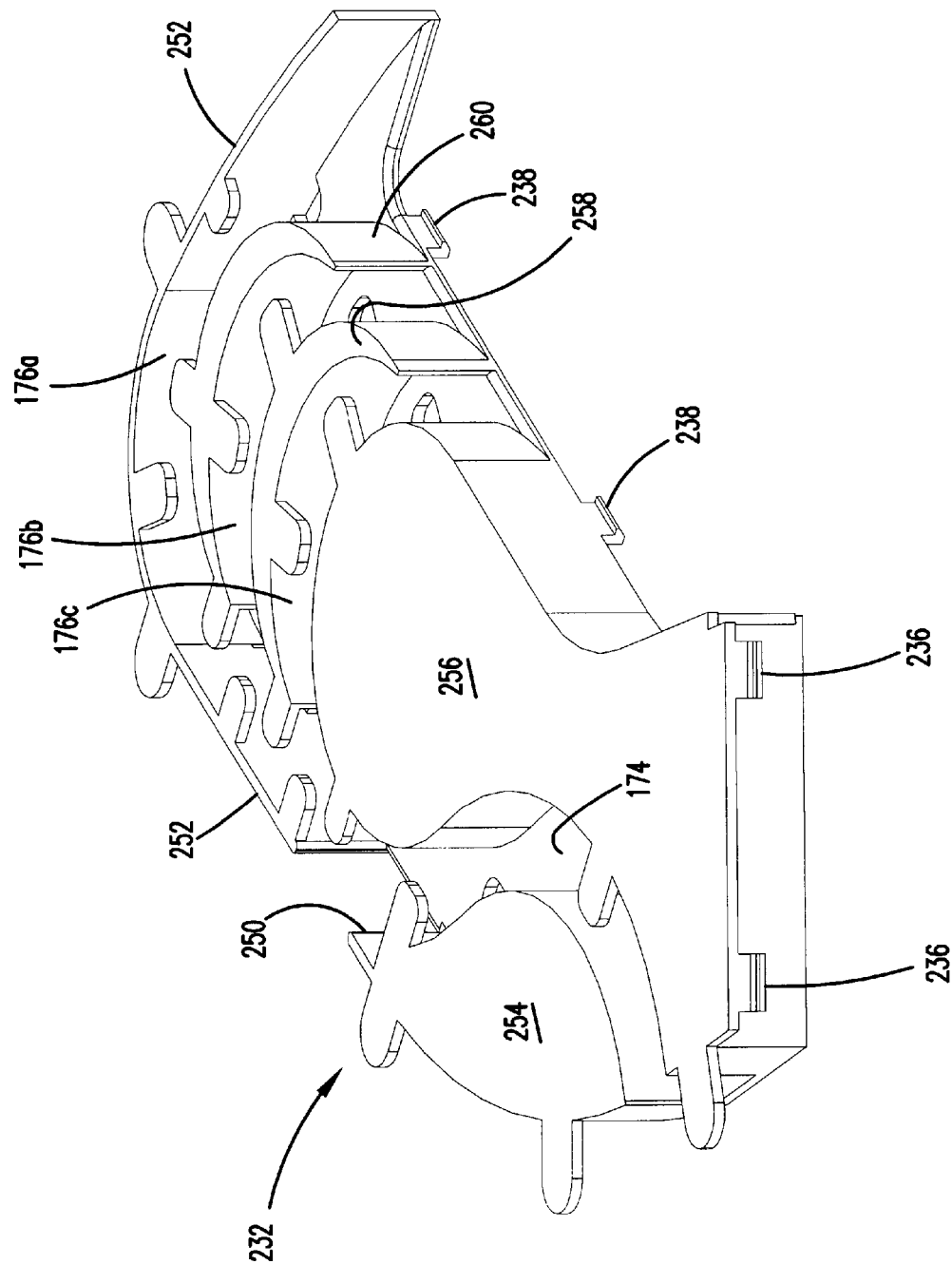
FIG. 48 is a top perspective view of the tray insert of the tray of FIG. 33.

Tray 170 also includes a cable storage pathway 198 connected to cable pathway 194 which loops back around tray 170. A crossover region 200 (see FIG. 47) allows entry and exit cables to cross without interference. Cable pathway 174 is vertically deeper than cable pathways 194, 198 at crossover region 200. Various tabs 204 maintain the cables in the respective cable pathways 174, 194, 198.

Tray 170 includes a hinge region 206 including a plate portion 207, a separate washer 207a, including a central opening 208 for mounting to tray hinge support 154 of sliding pivot member 120. Plate portion 207 defines a tapered recess 207b for receipt of washer 207a having a tapered outside surface, and a tapered inner surface for receipt of a flathead screw, in the preferred embodiment. A screw or other fastener or hinge pin is positioned through central openings 208, 156 of hinge region 206 and front hinge portion 134, respectively, to create a pivot point for tray 170 relative to sliding pivot member 120. Trays 170a rotate in an opposite direction. As shown in FIG. 10, extended and rotated tray 170 provides access to a technician to bulkhead area 180 as well as to all of the cable pathways 174, 176a–c, 194, 198. Tray 170 further includes a fingertab 209 for use in pulling tray 170 from the retracted position (FIG. 6) to the unrotated and extended position (FIG. 7), and then for rotating tray 170 to the rotated and extended position (FIG. 10).

Tray 170 includes a lower tray portion 230 (see FIGS. 41–46) and a tray insert 232 (see FIGS. 48–52) which snap fittingly engage one another via tabs 236, locking clips 238, and recesses 240, 242 for receiving tabs 236 and clips 238, respectively. Lower tray portion 230 includes a plurality of openings 246, 247 for accessing bulkhead area 180. Lower tray portion 230 has an upstanding wall 248 which forms cable pathways 194, 198. Tray insert 232 includes an S-shaped pathway for pathway 174 defined by first and second wall portions 254, 256. Second wall section 256 also cooperates with first and second curved wall sections 258, 260, along with outer wall 252 to form the termination pathways 176a–c. Lower tray portion 232 includes a recess 244 for receipt of locking tab 148 of sliding pivot member 120 to maintain tray 170 in the unrotated position until the desired time. Lower tray portion 230 and tray insert 232 are preferably made from molded plastic.

Separate curved termination pathways, such as three pathways 176a–c, are preferred so that a cable with multiple fibers can be cut to a single length. In the case of six fibers, bending all six around the same curved wall will not allow connection to six staggered adapters 182 without some slack or some pull being developed in some of the fibers. The multiple curved pathways allow for generally equal amounts of cable between adapters 182 and cable entry point 172.

Figure 35A:
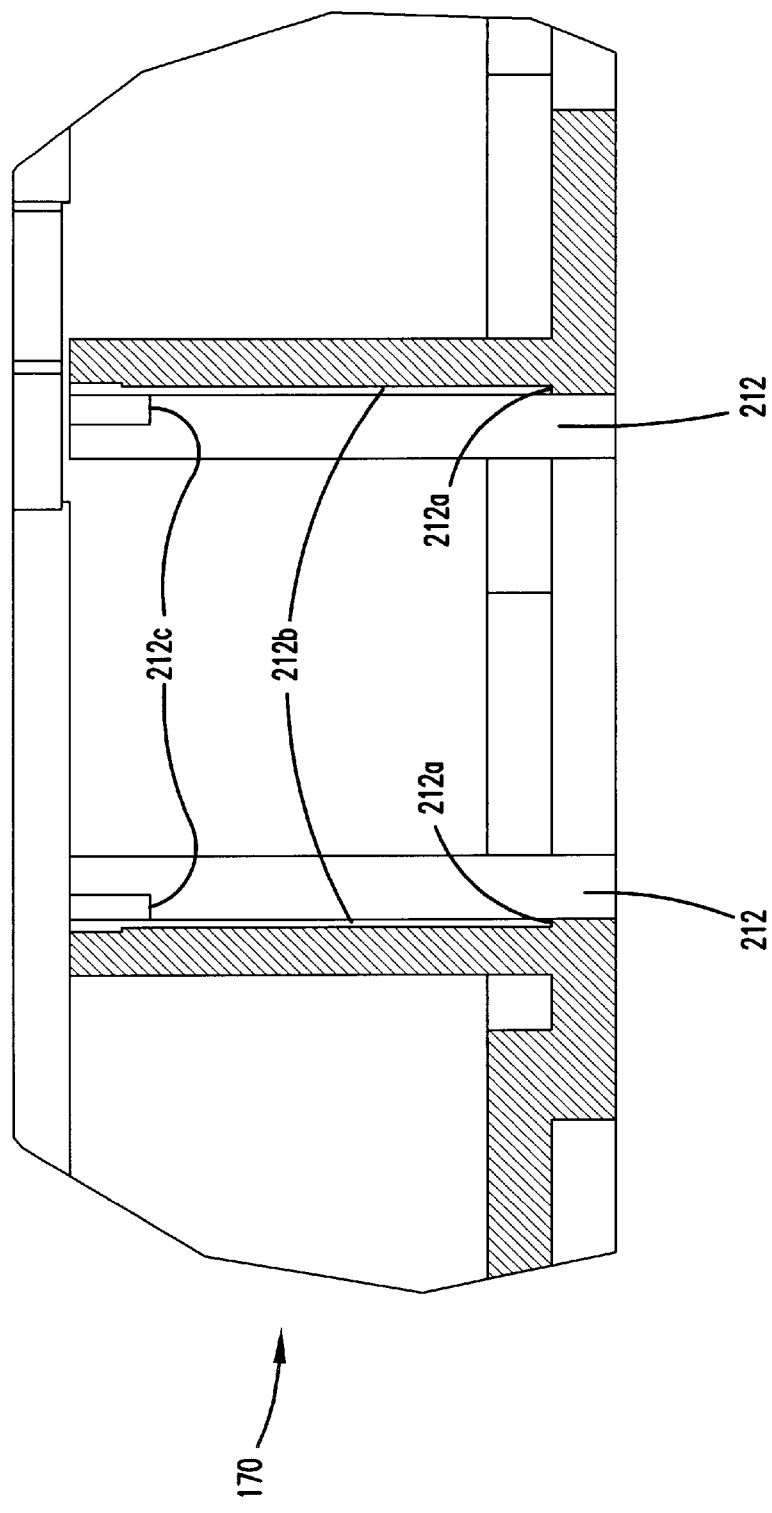
FIG. 35A is a side cross-sectional view of a portion of the bulkhead area of the tray.
Figure 36:
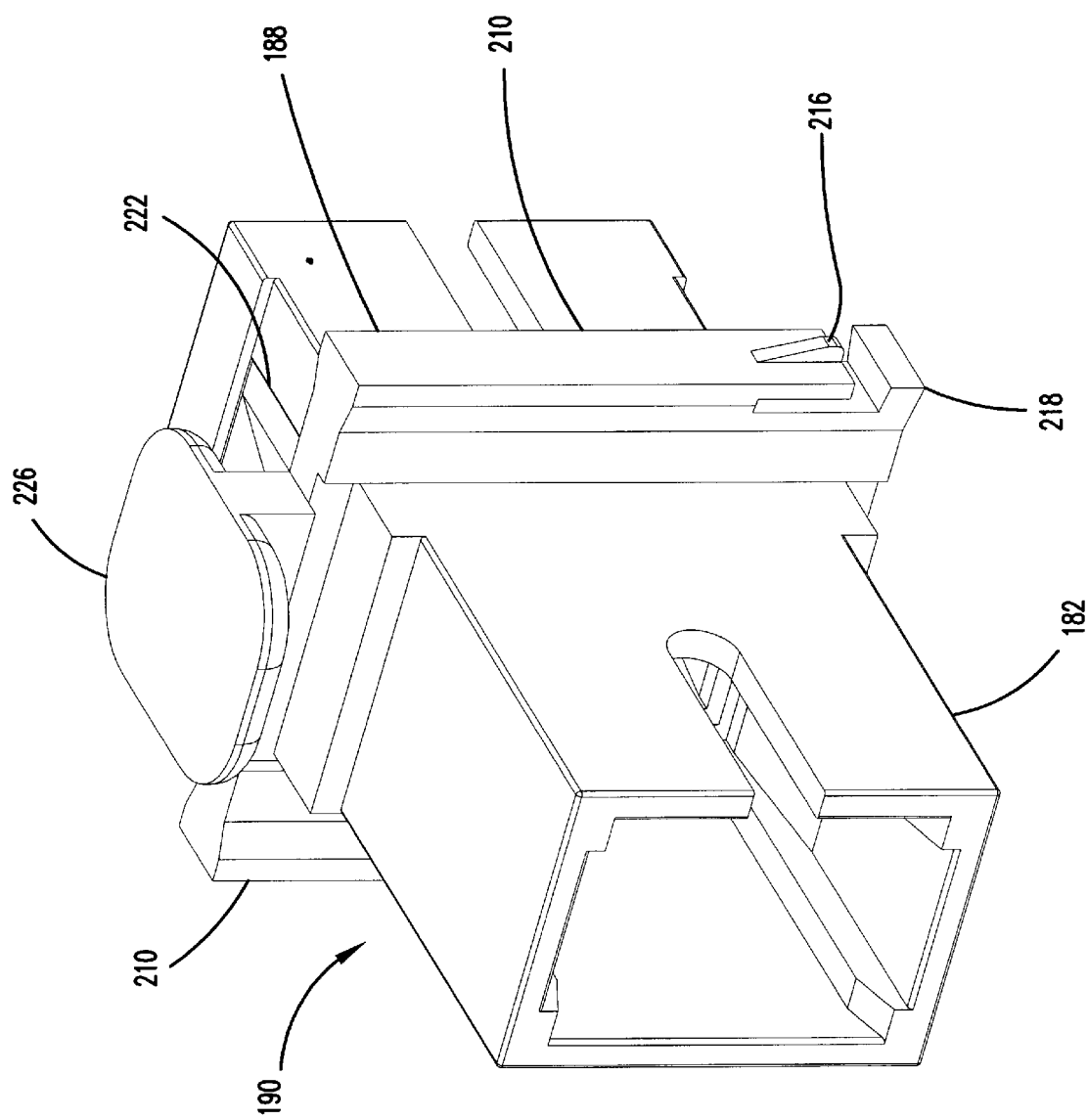
FIG. 36 is a top perspective view of the sliding adapter assembly of the tray of FIG. 33.
Figure 37:
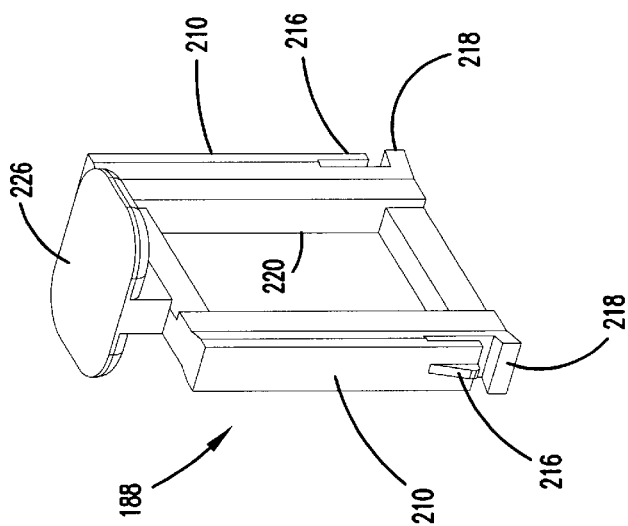
FIG. 37 is a top perspective view of the sliding adapter collar of the sliding adapter assembly of FIG. 36.
Figure 40:
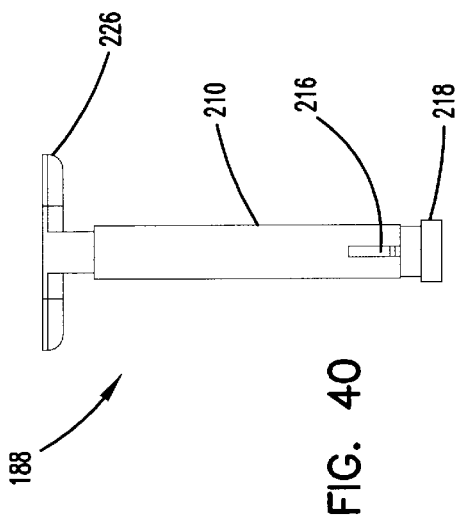
FIG. 40 is a side view of the sliding adapter collar.
Figure 38:
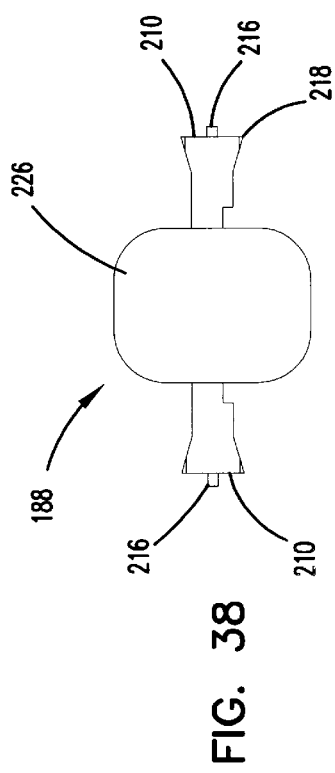
FIG. 38 is a top view of the sliding adapter collar.
Figure 39:
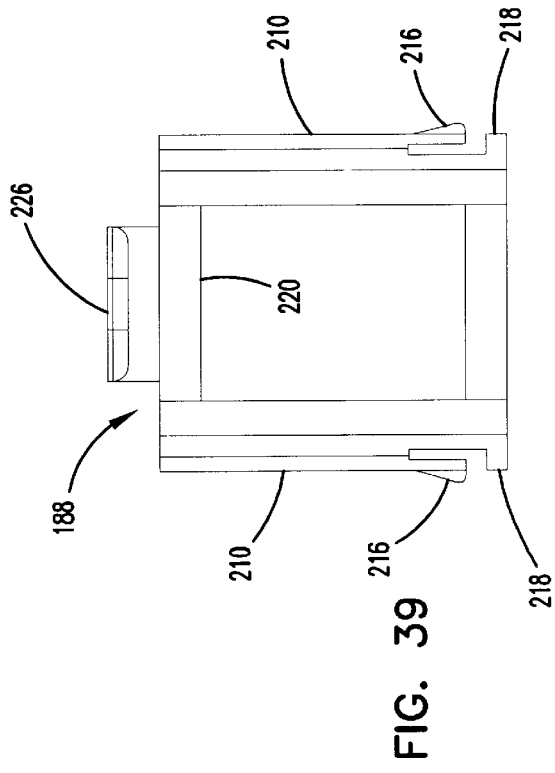
FIG. 39 is a front view of the sliding adapter collar.
Figure 41:
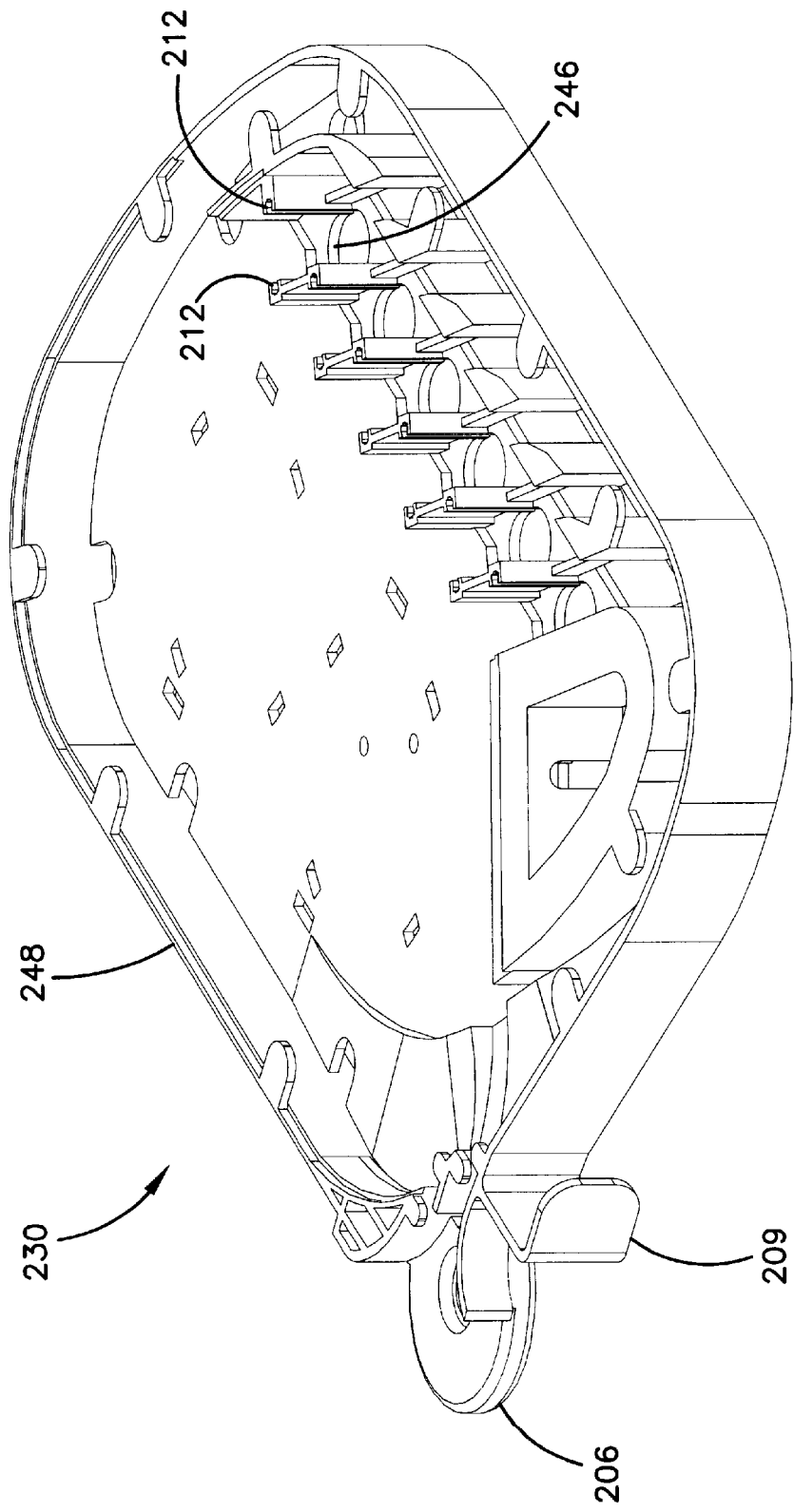
FIG. 41 is a top perspective view of the lower tray portion of the tray of FIG. 33.
Figure 42:
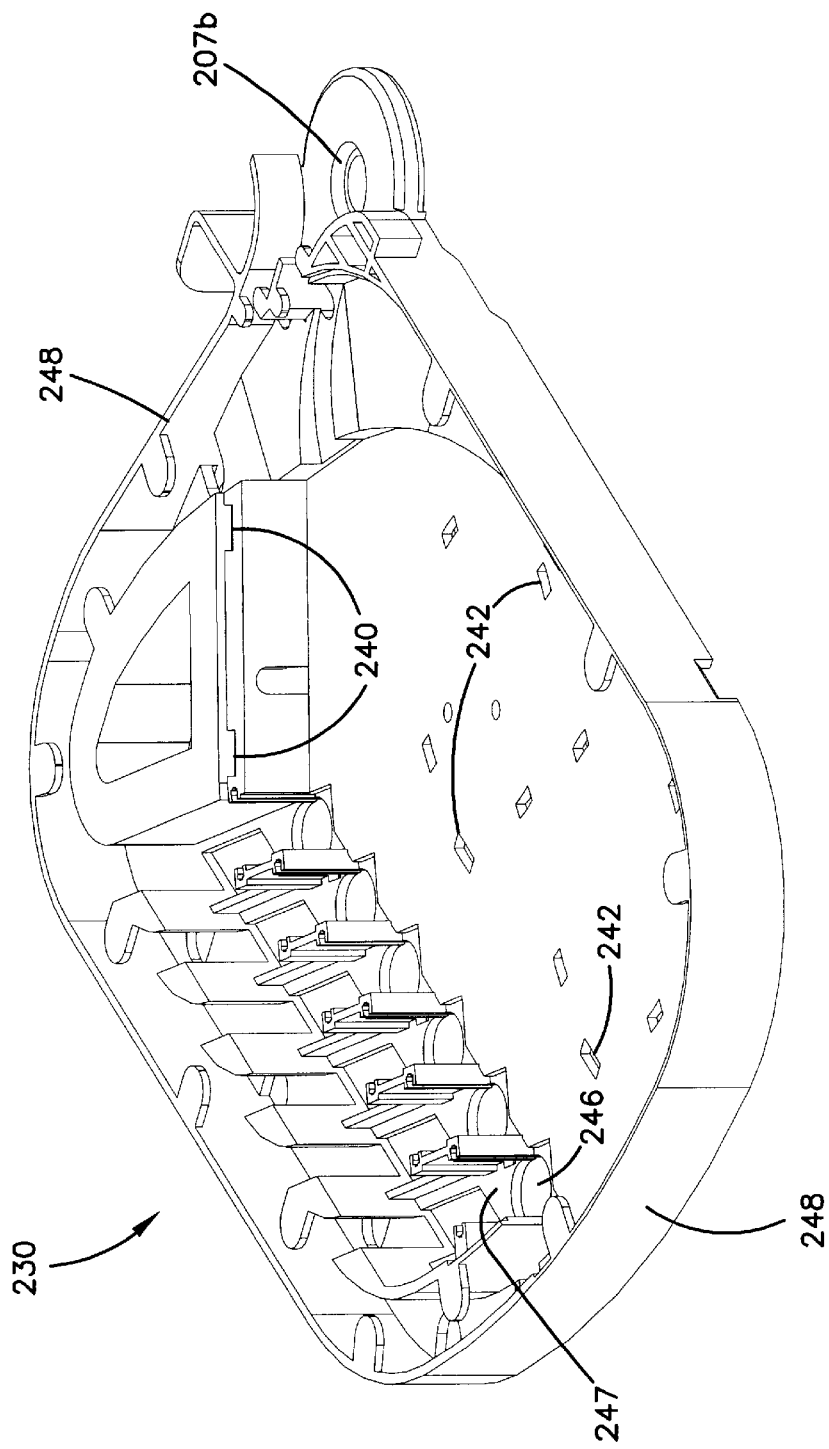
FIG. 42 is a further top perspective view of the lower tray portion.
Figure 43:
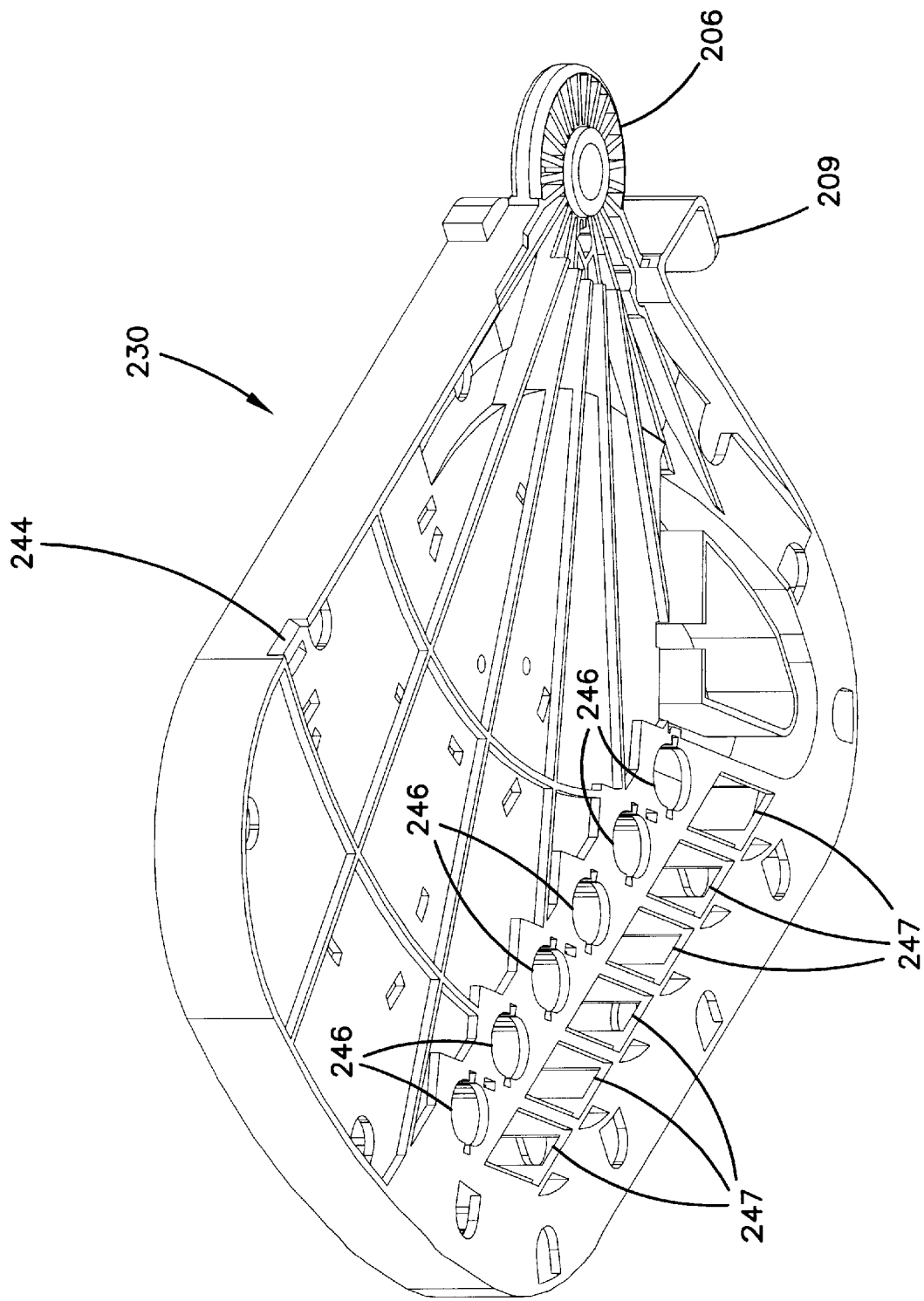
FIG. 43 is a bottom perspective view of the lower tray portion.
Figure 44:
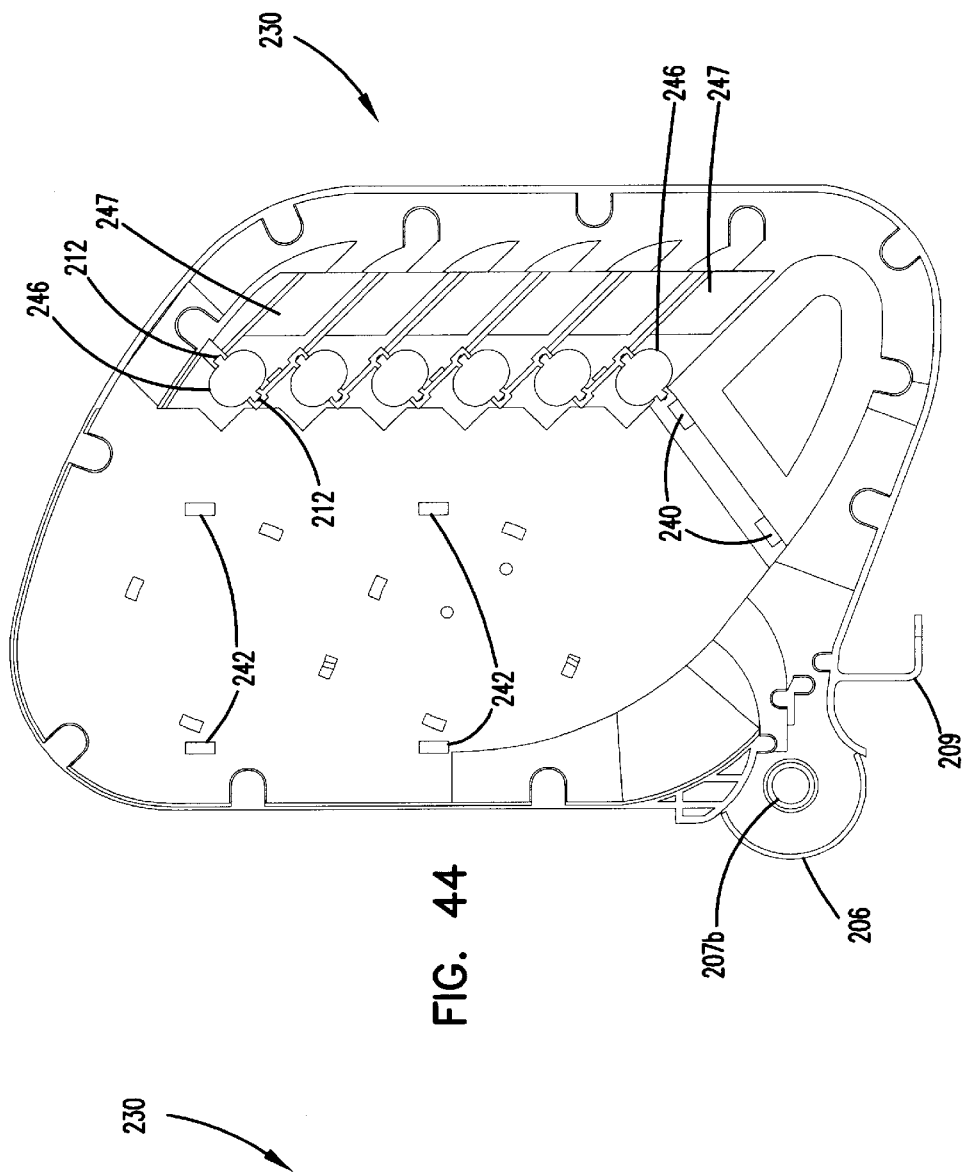
FIG. 44 is a top view of the lower tray portion.
Figure 45:
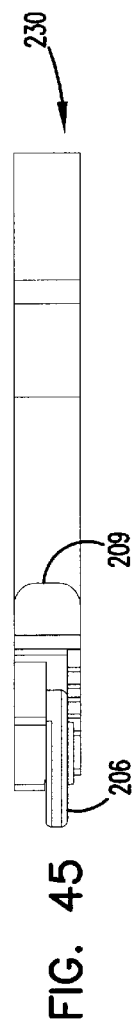
FIG. 45 is a front view of the lower tray portion.
Figure 46:
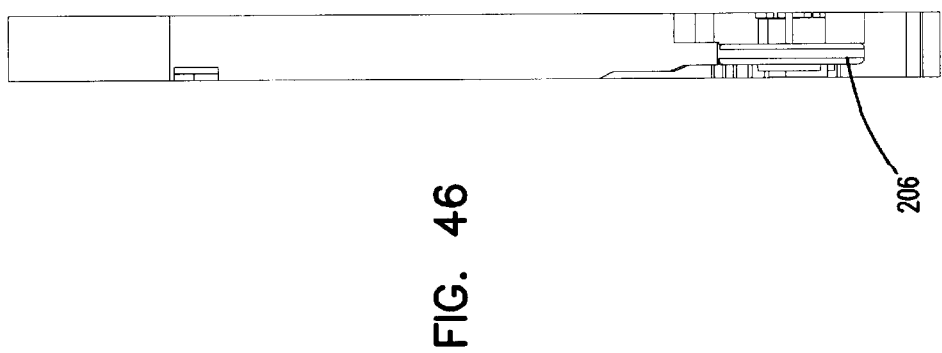
FIG. 46 is a side view of the lower tray portion.

Sliding adapter assembly 190 is slideably mounted to tray 170 between an upper position and a lower position. FIGS. 33 and 35 show one of the sliding adapter assemblies 190 in the upper position, and a remainder in the lower position. Side rails 210 of sliding adapter collar 188 are slideably received within vertical rail recesses 212 of lower tray portion 230. Each sliding adapter assembly 190 is assembled by first inserting a sliding adapter collar 188 up through a bottom of tray 170 up through opening 246. Once inserted, flexible and ramped locking tabs 216 prevent downward removal by engagement with stops 212*a* (see FIG. 35A). Tabs 216 ride in channels 212*b* during use. Stops 218 limit the amount of upward movement of each sliding adapter collar 188 by engagement with a corresponding stop surface 212*c* within an upper portion of each rail recess 212 (two stop surfaces 212*c* per rail recess). Once each sliding adapter collar 188 is positioned within tray 170, an adapter 182 is slideably inserted through each opening 220 and locked into place via a spring clip 222 of adapter 182. To facilitate ease of use of sliding adapter assembly 190, a top finger tab 226 is provided. Adapter 182 as shown is constructed in accordance with U.S. Pat. No. 5,317,663, the disclosure of which is incorporated by reference. Opening 220 and other mounting arrangements besides spring clip 222 are possible for mounting to other adapters having different shapes, including duplex adapters.

In one example use, a trunk cable consisting of multiple optical fibers enters device 20 at gap 64*a* (see FIG. 1). The cable travels across the back of device 20, around a vertical spool 300, and back to notch 98 of drawer 66 (see the arrows in FIG. 6). At drawer 66, the cable is spliced and/or stored as needed. From drawer 66, the cable (such as in the form of one or more multi-fiber jacketed cables, single fiber jacketed cables, or single fibers) is routed back from notch 98, around vertical spool 300, and around a horizontal spool 302 to one or more of sliding pivot members 120, 120*a* (see arrows in FIG. 7). The location of vertical spool 300 in an opposite side of device 20 from notch 98 facilitates improved cable life by taking advantage of pivoting action of the cable, instead of pulling when drawer 66 is pulled to the extended position. Vertical spool 300 is mounted to bottom cover 40 via a screw or other fastener. Horizontal spool 302 is mounted by a screw or other fastener to a vertical inner wall 304. Vertical inner wall 304 is mounted to bottom cover 40 via a similar peg and recess with adhesive, interference fit or snaps as side wall members 50. Vertical inner wall 304 is also formed from identical and individual sections 306, also joined to one another by a similar peg and recess system. Each section 306 includes two ends 308, 309 with rearwardly curved tips 308*a*, 309*a*. Each end 308, 309 is configured to support a cable, or a corrugated tube end secured with a cable tie or a metallic wire retaining ring. In the case of a corrugated tube protecting the cable, the tube can be mounted between an end 308 and an end 140 of a sliding pivot member 120. The locations of ends 308, 309 of wall 304 and ends 140 of sliding pivot members 120, 120*a* allow the cable to pivot, rather than pull when each sliding pivot member 120, 120*a* is pulled to the extended position. Locator holes 304*a* allow for a single fastener to mount spool 302 to wall 304.

Continuing with the example use of device 20, the cable (in the form of one or more jacketed cables or optical fibers) extends through the sliding pivot member 120 to enter the tray 170 mounted to the sliding pivot member 120 at entry point 172 (see arrows in FIGS. 29 and 34). At tray 170, the cable terminates at bulkhead area 180 where a further cable ("distribution line" or "patch cord", typically jacketed) is connectable as desired via adapter 182 and connector 184*b* to exit tray 170 at exit point 196 (see arrows in FIG. 34). As desired, extra lengths of the exiting cable can be wound around tray 170 in cable storage pathway 198, as desired, for storage (see arrows in FIG. 34). From tray 170, the exiting cable passes through notches 58*a*, 58*b* of side wall members 50 or notches 118 of top cover 46 and enters cableway 58 of device 20 for routing to another device 20 or other optical fiber signal transmission equipment.

Figure 53:
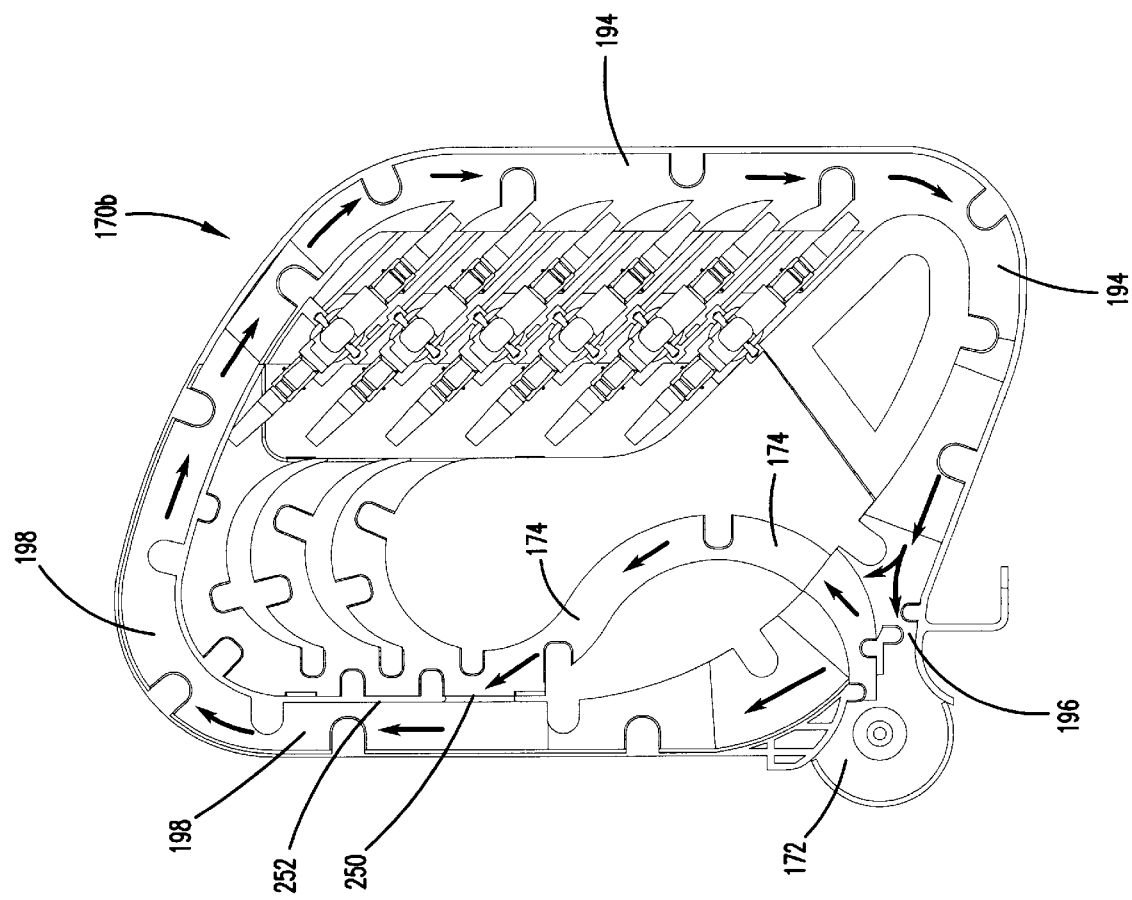
FIG. 53 is a top view of an alternative tray illustrating cable storage capability.

Referring now to FIG. 53, there is illustrated a storage only situation where cable is stored on tray 170*b*. The cable enters tray 170*b* at entry point 172 and enters cable pathway 174. Instead of the cable entering cable termination pathways 176*a*, 176*b*, 176*c* and traveling to bulkhead area 180, the cable passes through a gap 250 in wall 252 and enters cable storage pathway 198 and pathway 194 (see also FIGS. 33 and 47). The cable is looped as many times as desired, and exits tray 170*b* at exit point 196 (see arrows of FIG. 53). This use allows for a length of cable to enter device 20 from cableway 58 for storage, and to return to cableway 58 once the excess length is stored.

Figure 54:
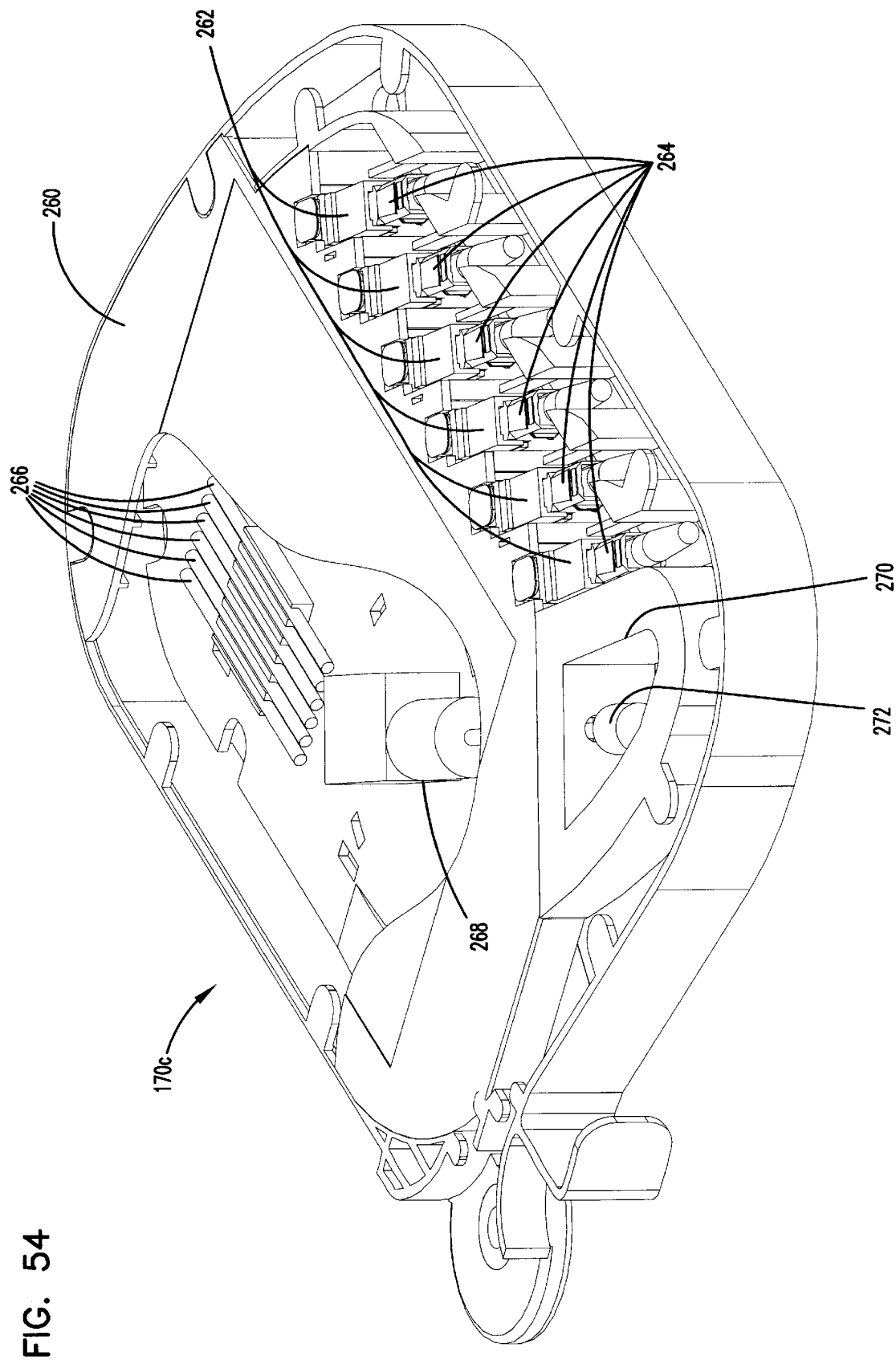
FIG. 54 is a perspective view of a further alternative tray including cable component mounting capability, with a portion of the top cover removed.
Figure 55:
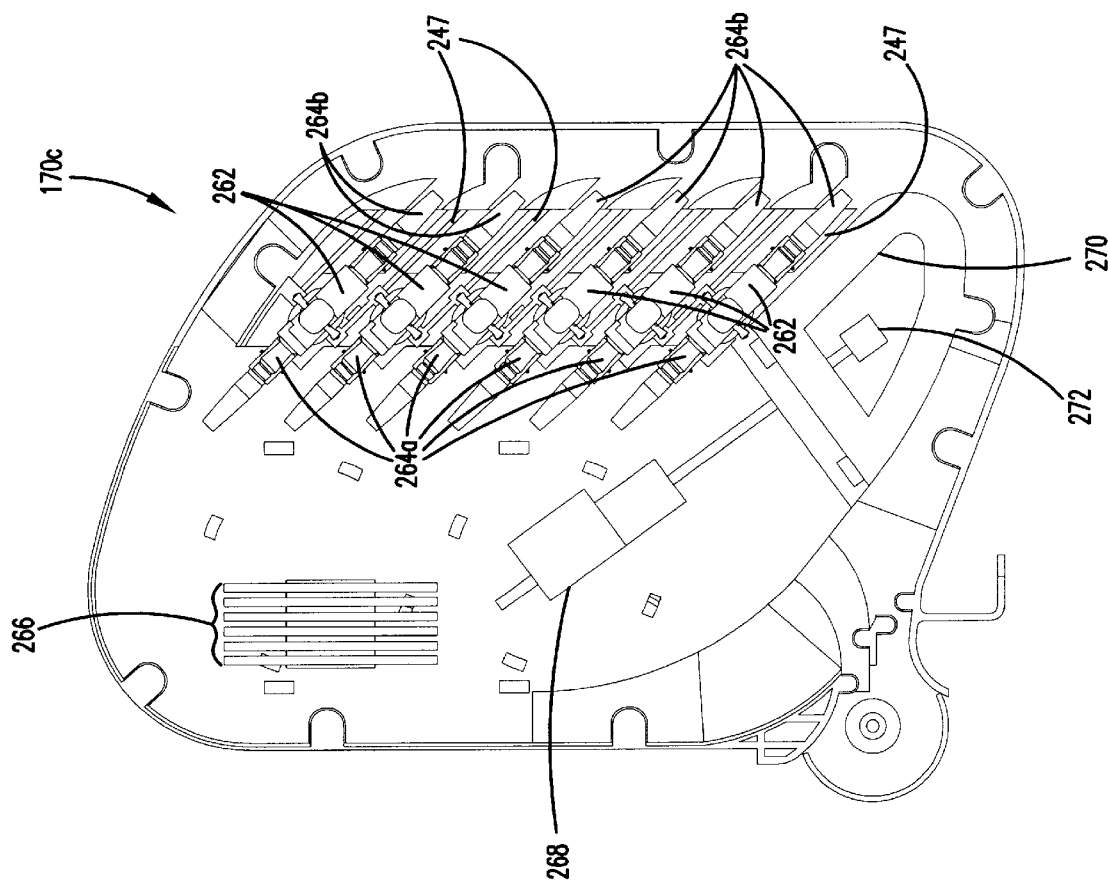
FIG. 55 is a top view of the tray of FIG. 54, without the top cover.

Referring now to FIGS. 54 and 55, tray 170*c* is configured to include cable component features disposed underneath a snap fit cover 260. Instead of termination points at bulkhead area 180, there is shown various adapters 262 and connectors 264*a*, 264*b*. Connectors 264*a* are linked to components 266 by suitable means. A technician can connect and disconnect connectors 264*a*, 264*b*, as desired. In the embodiment of tray 170*c*, adapters 262 are slideable upward like sliding adapter assemblies 190 described above. However, removable cover 260 prevents each adapter 262 from being lifted up when positioned on tray 170*c*. Openings 247 allow a technician two sided finger access to each connector 264*b*. Alternatively, cover 260 can be reconfigured to allow upward travel of each adapter 262. FIGS. 54 and 55 also illustrate a switch 268 linked by suitable means to components 266, and accessible at opening 270 through tray 170*c* where switch 268 includes a rotatable knob 272. Tray 170*b* can include various cable components including splices, couplers, wave division multiplexers, splitters/combiners. In this usage, cable enters and exits tray 170*c*, but is not utilized for storage. Top tray 170*a* on the right side of device 20 is configured as cable component mounting tray with cover.

Device 20 is advantageous in its modular design such that during assembly, the desired height of device 20, including the desired number of trays 170, 170*a*, 170*b*, 170*c* and the desired types and locations of the trays can be selected. Also, the desired number and location of drawers 66 can also be selected. The individual trays can also be removed and replaced by new or different trays at later time by releasing the hinge fastener, as desired. Also, the various curves of device 20 and the avoidance of sharp edges in device 20 helps protect the various optical fibers from damage. Also, the configuration of device 20 prevents or reduces the likelihood of cable damage during movement of each tray and each drawer, such as from excessive cable bending or pulling.

Having described the present invention in a preferred embodiment, modifications and equivalents may occur to one skilled in the art. It is intended that such modifications and equivalents shall be included within the scope of the claims which are appended hereto.

What is claimed is:

1. A tray for a cable management device comprising:

a body defining a cable storage pathway disposed around an outer periphery of the body; and a bulkhead area disposed within the cable storage pathway, the bulkhead area including a plurality of adapters slideably mounted to the body, wherein the adapters are in a staggered linear arrangement, each adapter defining a longitudinal axis of insertion for a connector, and further wherein each adapter is moveable in a direction transverse to the linear and staggered arrangement between first and second positions, wherein the direction of a movement of each adapter is transverse to the longitudinal axis of each respective adapter.

2. The tray of claim 1, further comprising a collar for mounting at least one adapter to the bulkhead area, the collar including:

a collar body having first and second ends and defining first and second outwardly facing rails, each rail terminating in a flexible tab at one end of each rail and disposed at the second end of the collar body, each flexible tab including an outwardly facing ramp;

a stop adjacent to the one end of each rail;

a tab at the first end of the collar body and defining a finger grasping surface; and the collar body having a central passage for receipt of the adapter, wherein the bulkhead area defines two opposed channels for the collar, each channel defining first and second spaced apart stops, the first stop engageable with the ramp, the second stop engageable with the stop of the collar, wherein the collar is slidably mounted to the body and constrained in movement by the first and second stops of each channel.

3. The tray of claim 2, further comprising a clip for mounting the adapter to the central passage of the collar body.

4. The tray of claim 1, further comprising a housing defining an enclosed interior, and a moveable door, the interior accessible through the moveable door, the tray mounted to the housing and disposed within the interior, the tray moveable to a position at least partially outside the housing.

5. A collar for mounting to a fiber optic adapter comprising:

a body having first and second ends and defining first and second outwardly facing rails, each rail terminating in a flexible tab at one end of each rail and disposed at the second end of the body, each flexible tab including an outwardly facing ramp;

a stop adjacent to the one end of each rail;

a tab at the first end of the body and defining a finger grasping surface; and the body having a central passage for receipt of the adapter.

6. The collar of claim 5, further comprising an adapter including a clip for mounting the adapter to the central passage of the body of the collar.

7. The collar of claim 5, wherein each rail includes a longitudinally extending section defining a dove-tail shape.

8. A cable management tray comprising:

(a) a tray body defining a bulkhead area, the bulkhead area defining a plurality of pairs of channels, at least one channel of each pair including first and second spaced apart stops;

(b) a collar received by each pair of channels, each collar slidably mounted to one of the pairs of channels, each collar including:

(1) a collar body having first and second ends and defining first and second outwardly facing rails, at least one rail terminating in a flexible tab at one end of the rail and disposed at the second end of the collar body, the flexible tab including an outwardly facing ramp;

(2) a stop adjacent to the one end of the rail;

(3) a tab at the first end of the collar body, defining a finger grasping surface; and (4) the collar body having a central passage for receipt of an adapter;

(c) at least one adapter mounted within the central passage of the collar body of each collar, the adapter movable with the slidably mounted collar, wherein the collars are positioned in a linear arrangement on the tray body, and further wherein each adapter is movable in a direction transverse to the linear arrangement between the first and second positions defined by the first and second stops of the channel, and further wherein the direction of movement of the adapter is transverse to a longitudinal axis of each adapter.

9. The tray of claim 8, wherein the tray body further defines a cable storage pathway disposed around an outer periphery of the tray body and surrounding at least a portion of the bulkhead area.

10. The tray of claim 9, wherein the tray body further defines a cable splice area for holding a plurality of cable splices.

11. The tray of claim 8, wherein the collars are in a staggered linear arrangement.

12. The tray of claim 8, wherein each adapter includes a clip for mounting the adapter within the central passage of the collar body of the collar.

13. The tray of claim 8, further comprising a housing defining an enclosed interior, and a moveable door, the interior accessible through the moveable door, the tray body mounted to the housing and disposed within the interior, and tray body moveable to a position at least partially outside the housing.

14. A cable management tray comprising:

(a) a tray body defining a bulkhead area, the bulkhead area defining a plurality of pairs of channels, each channel of each pair including first and second spaced apart stops;

(b) an adapter module received by each pair of channels, each module slidably mounted to the channels, each module including:

(1) first and second outwardly facing rails, each rail including a flexible tab, the flexible tab including an outwardly facing ramp;

(2) a stop adjacent to one end of each rail; and (3) a central passage for receipt of two connectors held by the module in axial alignment along a longitudinal axis of the module;

(c) wherein the modules are positioned in a linear arrangement on the tray body, and further wherein each module is movable in a direction transverse to the linear arrangement between the first and second positions defined by the first and second stops of the channels, and further wherein the direction of movement of the module is transverse to the longitudinal axis of each module.

15. The tray of claim 14, wherein the tray body further defines a cable storage pathway disposed around an outer periphery of the tray body and surrounding at least a portion of the bulkhead area.

16. The tray of claim 15, wherein the tray body further defines a cable splice area for holding a plurality of cable splices.

17. The tray of claim 14, wherein the modules are in a staggered linear arrangement.

* * * * *